(12) United States Patent
Goto

(10) Patent No.: US 8,722,175 B2
(45) Date of Patent: May 13, 2014

(54) LIQUID COMPOSITION, RECORDING METHOD, AND RECORDED MATTER

(75) Inventor: Hiroshi Goto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 231 days.

(21) Appl. No.: 13/159,942

(22) Filed: Jun. 14, 2011

(65) Prior Publication Data

US 2011/0318543 A1 Dec. 29, 2011

(30) Foreign Application Priority Data

Jun. 29, 2010 (JP) ................. 2010-147607

(51) Int. Cl.
  *B32B 3/10* (2006.01)
  *B41F 33/00* (2006.01)
  *C09D 7/00* (2006.01)

(52) U.S. Cl.
  USPC .................................. 428/195.1; 101/483

(58) Field of Classification Search
  USPC ........................................ 101/483; 428/195.1
  See application file for complete search history.

(56) References Cited

U.S. PATENT DOCUMENTS

| | | | |
|---|---|---|---|
| 7,919,544 B2 | 4/2011 | Matsuyama et al. | |
| 2003/0064206 A1* | 4/2003 | Koyano et al. | 428/195 |
| 2006/0023042 A1* | 2/2006 | Doi | 347/100 |
| 2007/0188571 A1* | 8/2007 | Tokita et al. | 347/100 |
| 2007/0197685 A1 | 8/2007 | Aruga et al. | |
| 2008/0233363 A1 | 9/2008 | Goto | |
| 2009/0098312 A1 | 4/2009 | Goto et al. | |
| 2009/0176070 A1 | 7/2009 | Goto et al. | |
| 2009/0202724 A1* | 8/2009 | Arai et al. | 427/256 |

(Continued)

FOREIGN PATENT DOCUMENTS

| | | |
|---|---|---|
| JP | 2006-035689 | 2/2006 |
| JP | 2008-018562 | 1/2008 |

(Continued)

*Primary Examiner* — Gerard Higgins
*Assistant Examiner* — Sathavaram I Reddy
(74) *Attorney, Agent, or Firm* — Oblon, Spivak, McClelland, Maier & Neustadt, L.L.P.

(57) ABSTRACT

A liquid composition, which contains: a water-soluble organic acid represented by the following general formula (1); a water-soluble amine represented by the following general formula (2); a water-soluble organic solvent; and water, wherein an amount of the water-soluble amine contained in the liquid composition is 0.9 or larger molar equivalent relative to acid groups contained in the water-soluble organic acid, General Formula (1)

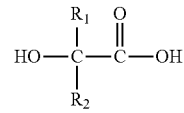

where $R_1$ is a hydroxyl group, a methyl group, or a hydrogen atom; and $R_2$ is a hydroxyl group, or a methyl group, General Formula (2)

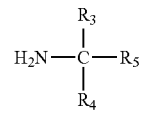

where $R_3$ is a hydroxymethyl group; $R_4$ is a methyl group, an ethyl group, or a hydroxymethyl group; and $R_5$ is a hydrogen atom, a C1-4 alkyl group, or a hydroxymethyl group. The water-soluble organic acid and the water-soluble amine form a salt in the composition.

8 Claims, 2 Drawing Sheets

(56) References Cited

U.S. PATENT DOCUMENTS

2010/0196601 A1  8/2010  Goto et al.
2010/0196602 A1  8/2010  Koyano et al.
2010/0295891 A1  11/2010  Goto et al.

FOREIGN PATENT DOCUMENTS

| | | |
|---|---|---|
| JP | 4329642 | 6/2009 |
| JP | 2010-241068 | 10/2010 |
| WO | WO 00/06390 | 2/2000 |

* cited by examiner

LIQUID COMPOSITION, RECORDING METHOD, AND RECORDED MATTER

BACKGROUND OF THE INVENTION

1. Field of the Invention

The present invention relates to a liquid composition, a recording method using the liquid composition, and a recorded matter recorded by the recording method.

2. Description of the Background

Currently, in order to respond to a demand for recording a color image in an inexpensive manner, an inkjet recording method, which is capable of recording an image by application of a number of inks of different colors to a medium for recording (referred to as "a recording medium" hereinafter) without a coated layer such as a plain paper, has been used. In such a method, an ink is applied to a recording medium to which a coated layer has not been provided, and thus the ink is directly absorbed by paper, which is a support for the recording medium. Such absorption of the ink by the paper tends to lower quality of the recorded recording medium (referred to as "recorded matter" hereinafter) due to bleeding.

To solve this problem, an ink of low permeability is used for recording to thereby suppress penetration of the ink into a recording medium, and as a result, bleeding at a boarder between the recording medium and ink of the recorded matter (referred to as "feathering" hereinafter) is prevented. In this case, however, the ink tends to stay on a surface of the recording medium, and thus drying properties of the recorded matter degrades.

When the drying properties of the recorded matter is low, any contact to the ink before drying, such as with fingers, may cause smear in the image, or in case of recording of color image bleeding may be occurred at the boarder between inks (referred to as "color bleeding" hereinafter) by unintentionally depositing an ink of one color onto another ink of another color before dying. In the case where an ink of high permeability is used for preventing color bleeding, the aforementioned feathering occurs, which lowers the quality of the resulting recorded matter.

To solve these problems at the same time, there is a description of a recording method in which an ink and a liquid composition, which helps the ink to be fixed on a recording medium, are used. For example, there is an inkjet recording method in which an ink and a liquid composition containing certain polymer particles are deposited on a recording medium to perform recording (see International Application Publication No. WO 2000/06390).

In this description, the dispersion state of a coloring agent contained in the ink is destroyed by polyallkyl amine contained in the liquid composition, once the liquid composition and the ink are brought into contact to each other, and then the coloring agent is aggregated, which realizes image printing without causing significant bleeding. However, using the polymer particles has a problem in the stability of the liquid composition. A large amount of polymer particles is required to fix the ink using the polymer particles. The liquid composition having a large amount of the polymer particles tends to increase its viscosity, and such liquid composition tends to cause problems such as in jetting stability or storage stability, as the viscosity thereof increases.

As a recording method without using particles in a liquid composition, there is a description of a recording method using an ink and a liquid composition containing a certain organic acid and a certain organic amine compound (see Japanese Patent Application Laid-Open (JP-A) No. 2006-35689). In accordance with this description, once the liquid composition and the ink are mixed, the pH (potential hydrogen) value of the mixture stays at the side of acid, which can effectively aggregates a coloring agent contained in the ink.

This method using the acidic liquid composition, however, has a problem in fixing ability of the ink. When an ink is applied to a surface of a recording medium, which has been treated with the acidic liquid composition, the coloring agent contained in the ink are immediately aggregated and deposited on the recording medium. This layer of the deposited coloring agent has low resistance to abrasion (referred to as "abrasion resistance" hereinafter), and thus hands of users, back surfaces of printed matter, and the like may be smeared with the ink by being in contact with the recorded matter after drying.

SUMMARY OF THE INVENTION

The present invention aims to provide a liquid composition capable of forming a recorded matter of high fixing ability as well as preventing occurrences of feathering and color bleeding, a recording method using the liquid composition, and a recorded matter recorded by the recording method.

The means for solving the aforementioned problems are as follows:

Embodiment 1

A liquid composition, containing:

(a) a salt of (i) a water-soluble organic acid represented by the following general formula (1); and (ii) a water-soluble amine represented by the following general formula (2);

(b) a water-soluble organic solvent; and (c) water, wherein an amount of the water-soluble amine contained in the liquid composition is at least 0.9 mol relative to 1 mol of the acid groups contained in the water-soluble organic acid, General Formula (1)

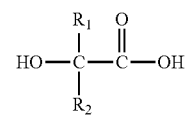

where $R_1$ is a hydroxyl group, a methyl group, or a hydrogen atom; and $R_2$ is a hydroxyl group, or a methyl group, General Formula (2)

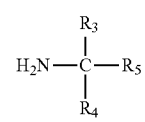

where $R_3$ is a hydroxymethyl group; $R_4$ is a methyl group, an ethyl group, or a hydroxymethyl group; $R_5$ is a hydrogen atom, a C1-4 alkyl group, or a hydroxymethyl group.

Embodiment 2

The liquid composition according to Embodiment 1, wherein the water-soluble organic acid is lactic acid.

Embodiment 3

The liquid composition according to any of the embodiments described above, wherein the water-soluble amine is 2-amino-2-methyl-1,3-propanediol, or 2-amino-2-ethyl-1,3-propanediol.

Embodiment 4

The liquid composition according to any of the embodiments described above, wherein an amount of the water-soluble organic acid represented by the general formula (1) is 1% by mass to 40% by mass relative to a total amount of the liquid composition.

Embodiment 5

The liquid composition according to any of the embodiments described above, wherein the amount of the water-soluble amine contained in the liquid composition is 0.9 mol to 1.5 mol relative to 1 mol of the acid groups contained in the water-soluble organic acid.

Embodiment 6

The liquid composition according to any of the embodiments described above, wherein the water-soluble organic solvent has an equilibrium moisture content of 30% by mass or more under conditions of 23° C. in temperature and 80% RH in humidity.

Embodiment 7

The liquid composition according to any of the embodiments described above, wherein the water-soluble organic solvent is at least one selected from the group consisting of 1,3-butanediol, 3-methyl-1,3-butanediol, and glycerin.

Embodiment 8

The liquid composition according to any of the embodiments described above, further containing a metal salt compound of organic acid, an inorganic metal salt compound, or both thereof.

Embodiment 9

The liquid composition according to any of the embodiments described above, further containing a fluorosurfactant, a silicone surfactant, or both.

Embodiment 10

The liquid composition according to any of the embodiments described above, further comprising a penetrating agent, wherein the penetrating agent is 2-ethyl-1,3-hexanediol.

Embodiment 11

The liquid composition according to any of the embodiments described above, wherein the liquid composition has a surface tension of 30 mN/m or lower.

Embodiment 12

The liquid composition according to any of the embodiments described above, wherein a pH value of the liquid composition is 5 to 9.5.

Embodiment 13

A recording method, comprising:
applying the liquid composition as defined in any of the embodiments described above to a recording medium; and
applying an ink to the recording medium to which the liquid composition has been applied, so as to record an image, where the ink contains a water-dispersible coloring agent, a water-soluble organic solvent, a surfactant, a penetrating agent, and water.

Embodiment 14

The recording method according to Embodiment 13 described above, wherein the liquid composition is applied to the recording medium in an amount of 0.1 g/m$^2$ to 16.0 g/m$^2$ on wet basis.

Embodiment 15

The recording method according to Embodiment 13 or 14, wherein the water-dispersible coloring agent is a pigment which is at least one selected from the group consisting of a self-dispersible pigment, and a resin-coated pigment.

Embodiment 16

A recorded matter, containing:
a recording medium; and
an image recorded on the recording medium,
wherein the image is recorded on the recording medium by the recording method as defined in any one of the embodiments described above.

The present invention solves various problems in the art, and achieves the object discussed above. The liquid composition of the invention contains a salt formed from the organic acid dissolved and the amine dissolved in the water.

When an ink is deposited on a recording medium to which this liquid composition has been deposited, a water-dispersible coloring agent contained in the ink is brought into contact with the salt contained in the liquid composition in the area inside of the recording medium where the liquid composition is deposited. As a result, the water-dispersible coloring agent is aggregated.

Since the water-dispersible coloring agent is fixed in the shallow area inside the recording medium due to the aggregations, occurrences of feathering or color bleeding can be prevented, as well as providing a recorded matter of high fixing ability.

DETAILED DESCRIPTION OF THE INVENTION

Liquid Composition

The liquid composition of the present invention contains the water-soluble organic acid described above, the water-soluble amine described above, a water-soluble organic solvent, and water, in which an amount of the water-soluble amine contained in the liquid composition is 0.9 molar equivalent or more relative to acid groups contained in the water-soluble organic acid.

The mechanism of fixation of an ink using the liquid composition of the present invention will be explained with reference to a schematic cross-sectional view of FIG. 1, explains the state of the recording part of the recorded matter of the present invention.

The liquid composition of the present invention contains a salt formed by neutralization of the organic acid dissolved in water with the amine dissolved in water. Once this liquid composition is deposited on a recording medium 101 formed of paper, the deposition part of the liquid composition 102 is formed on the recording medium. Within the deposition part 102, as the water-soluble organic solvent of the liquid composition retains water, part of the aforementioned salt remains dissolved in water.

When an ink is deposited on this deposition part 102, the pH of the ink will not be drastically changed because most part of the organic acid contained in the deposition part 102 has been neutralized to become neutral. Because of this neutralization of the organic acid, drastic aggregation (acid deposition) of the water-dispersible coloring agent is prevented after the ink is deposited, and hence a large amount of deposition of the water-dispersible coloring agent is also prevented on a recording medium. Therefore, abrasion resistance of the recorded matter improves.

Moreover, as an area of a dot formed on a surface of a recording medium with the water-dispersible coloring agent contained in the ink is increased as a result that the aggregation thereof is prevented, density of a recorded image (including characters and symbols) improves.

Once the ink penetrates into the deposition part 102 of the liquid composition on the recording medium 101, the water-dispersible coloring agent contained in the ink is brought into contact with a salt contained in the liquid composition, and loses dispersibility due to the function of the salt to thereby cause aggregation (acid deposition).

In this manner, the water-dispersible coloring agent 104 is fixed at the shallow position inside the recording medium, to thereby reduce occurrences of feathering and color bleeding.

Figure 1:
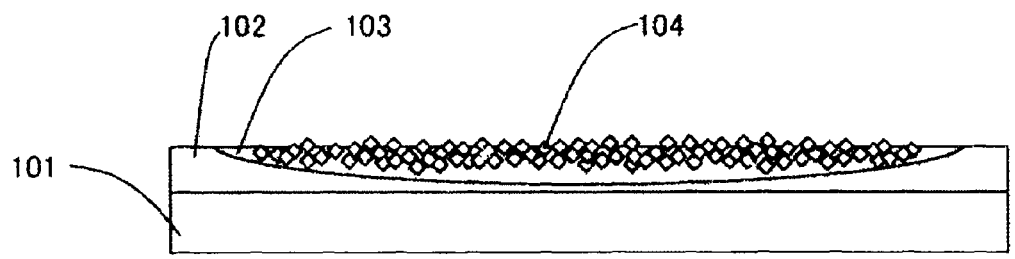
FIG. 1 is a schematic cross-sectional view showing an example of the state of the recorded part within the recorded matter of the present invention.

In FIG. 1, "103" indicates an ink deposition part.

The liquid composition of the present invention is preferably absorbed by a recording medium as fast as possible after being deposited on the recording medium, to thereby be in an apparent drying state. To this end, a surface tension of the liquid composition is preferably 30 mN/m or lower, more preferably 28 mN/m or lower at 25° C.

Note that, after the liquid composition penetrates into a recording medium, liquid such as water contained in the liquid composition does not need to lose its fluid state (i.e. becoming the solid state), as long as the liquid composition is in the apparent dry state. Even though the liquid composition is not in the solid state, provided that the liquid composition penetrates into the recording medium and be in the apparent dry state, the liquid composition enables to fix an ink thereon and improve quality of an image to be recorded.

Each component contained in the liquid composition of the present invention will be explained next.

Organic Acid

As the organic acid for use in the liquid composition of the present invention, a water-soluble organic acid represented by the general formula (1) is used for the reasons such as easiness to form a salt with the amine, having an effect of slowly aggregating an ink, and the like.

Here, "water-soluble" means properties of being dissolved in water. Accordingly, the organic acid represented by the general formula (1) in the form of a solid, fluid or gas is dissolved in water serving as a solvent to form a solution.

The number of carbon atoms contained in this organic acid are not particularly restricted, but they are preferably 6 or fewer per molecule in view of the water solubility of the organic acid. Examples of the water-soluble organic acid represented by the general formula (1) include lactic acid (pKa: 3.83).

The amount of the organic acid for use is preferably 1% by mass to 40% by mass, more preferably 3% by mass to 30% by mass relative to the total amount of the liquid composition. This range includes all specific values and subranges therebetween, including 2, 5, 10, 15, 20, 25 and 35% by mass.

When the amount of the organic acid is more than 40% by mass, there is a possibility that 0.9 molar equivalent or more of the amine cannot be added relative to acid groups contained in the organic acid. When the amount of the organic acid is less than 1% by mass, an obtainable effect of improving image quality may be small.

In the general formula (1), $R_1$ is a hydroxyl group, methyl group, or hydrogen atom, and $R_2$ is a hydroxyl group, or methyl group.

Amine

As the amine for the liquid composition of the present invention, a water-soluble amine represented by the following general formula (2) is used because of the reasons such as easiness to form a salt with the acid described above, having an effect of slowly aggregating an ink, and the like.

The amine represented by the general formula (2) may be in any form of a solid, fluid, or gas, and is dissolved in water serving as a solvent in the liquid composition of the present invention to thereby form a solution. Note that in the present specification "quaternary amine" means a compound whose four alkyl groups are each replaced with a nitrogen atom. Examples of the amine represented by the general formula (2) include 2-amino-2-ethyl-1,3-propanediol, 2-amino-2-(hydroxymethyl)-1,3-propanediol, 2-amino-2-methyl-1,3-propanediol, and 2-amino-2-methyl-1-propanol. Among them, 2-amino-2-methyl-1,3-propanediol, and 2-amino-2-ethyl-1,3-propanediol are particularly preferable, because they are highly safe to human bodies, and have high penetrating abilities to recording media.

In the general formula (2), $R_3$ is a hydroxymethyl group; $R_4$ is a methyl group, ethyl group, or hydroxymethyl group; and $R_5$ is a hydrogen atom, C1-4 alkyl group, or hydroxymethyl group.

The amount of the amine for use is preferably 0.9 mol to 1.5 mol, more preferably 0.9 mol to 1.2 mol relative to 1 mol of the acid groups contained in the water-soluble organic acid represented by the general formula (1). This range includes all specific values and subranges therebetween, such as 1.0, 1.1, 1.3 and 1.4.

When the amount of the amine is less than 0.9 mol relative to 1 mol of the acid groups contained in the organic acid, the organic acid is not sufficiently neutralized so that the water-dispersible coloring agent contained in the ink tends to aggregate (cause acid deposition). If the aggregation is occurred, a dot formed by the water-dispersible coloring agent in the recorded matter is overly tightened so that white lines (hereinafter, may be referred to as "white line") may be formed in the resulting image.

When the amount of the amine is more than 1.5 mol relative to 1 mol of the acid groups contained in the organic acid, liberated amine may accelerate penetration of the water-dispersible coloring agent contained in the ink to thereby lower density of an image to be recorded. Note that, this amine may be used to neutralize the organic acid represented by the formula (1) to make the liquid composition neutral to thereby lower metal corrosiveness of the liquid composition. In this case, the amount of the amine can be adjusted depending on the organic acid for use to adjust the pH value of the liquid composition to 5 or higher.

The pH value of the liquid composition of the present invention is preferably 5 to 9.5, more preferably 6.0 to 9.0. These ranges include all specific values and subranges therebetween, such as pH 5.5, 6.5, 7.0, 7.5, 8.0 and 8.5.

When the pH value of the liquid composition is lower than 5, the neutralization of the organic acid with the amine is not performed sufficiently to thereby give the resulting liquid composition high metal corrosiveness, as well as not providing sufficient effect of improving quality of the recorded matter. When the pH value thereof is higher than 9.5, the liberated amine may reduce a density of an image to be recorded.

The pH of the liquid composition can be measured, for example, by means of a pH meter (HM-30R, manufactured by DKK-TOA CORPORATION) at 25° C.

Water-Soluble Organic Solvent

The water-soluble organic solvent for use in the liquid composition of the present invention is added for the purpose of retaining water contained in the liquid composition. By adding the water-soluble organic solvent, the liquid composition is prevented from increasing its viscosity even when the liquid composition is dried to reach the equilibrium state of moisture.

Moreover, when the liquid composition is deposited on a recording medium, a salt formed with the organic acid and the amine is stabilized by water retained in the liquid composition. Therefore, the water-soluble organic solvent for use here is preferably a water-soluble organic solvent having high equilibrium moisture content.

In this specification, "equilibrium moisture content" means a moisture content of a mixture of a water-soluble organic solvent and water, which is stood left in the air of a constant temperature and constant humidity so that the evaporation of water in the mixture and absorption of water contained in the air by the ink become in the equilibrium state.

The equilibrium moisture content can be obtained by storing a Petri dish in which 1 g of a water-soluble organic solvent is weight and placed in a desiccator in which the temperature and humidity are maintained at 23±1° C., and 80±3% RH, respectively, using a saturated aqueous solution of potassium chloride until any change in mass is not observed, and calculating based on the following equation.

$$EMC\ (\text{wt \%}) = \frac{\text{Amount of moisture absorbed by water-soluble organic solvent}}{\text{Amount of water-soluble organic solvent} + \text{Amount of moisture absorbed by water-soluble organic solvent}} \times 100$$

Examples of the water-soluble organic solvent for use in the liquid composition of the present invention include polyhydric alcohols, polyhydric alcohol alkyl ethers, polyhydric alcohol aryl ethers, nitrogen-containing heterocyclic compounds, amides, amines, sulfur-containing compounds, propylene carbonates, and ethylene carbonates.

The water-soluble organic solvent suitably used for the present invention is a water-soluble organic solvent having an equilibrium moisture content of preferably 30% by mass or more, more preferably 40% by mass or more under the conditions of 23° C. in temperature and 80% RH in humidity (hereinafter, such water-soluble organic solvent is referred to as "water-soluble organic solvent A").

As the water-soluble organic solvent A, polyhydric alcohols are suitably used, and specific examples thereof include 1,2,3-butanetriol (boiling point (BP): 175° C., atmospheric pressure during the measurement of the boiling point (hereinafter, the atmospheric pressure during the measurement of the boiling point is merely referred to as "atmospheric pressure", and when the atmospheric pressure during the measurement of the boiling point is normal pressure, the atmospheric pressure itself is not described): 33 hPa, equilibrium moisture content (EMC): 38% by mass), 1,2,4-butanetriol (BP: 190° C. to 191° C., atmospheric pressure: 24 hPa, EMC: 41% by mass), glycerin (BP: 290° C., EMC: 49% by mass), diglycerin (BP: 270° C., atmospheric pressure: 20 hPa, EMC: 38% by mass), triethylene glycol (BP: 285° C., EMC: 39% by mass), tetraethylene glycol (BP: 324° C. to 330° C., EMC: 37% by mass), diethylene glycol (BP: 245° C., EMC: 43% by mass), and 1,3-butanediol (BP: 203° C. to 204° C., EMC: 35% by mass). Among them, glycerin and 1,3-butanediol are particularly preferably used, because they give low viscosity when they contain water, and can stable hold a coloring agent without causing aggregations.

The water-soluble organic solvent A is preferably used in an amount of 50% by mass or more relative to the total amount of the water-soluble organic solvent, because the resulting liquid composition improves jetting stability, and prevents depositions thereof to the recording device for use.

The liquid composition of the present invention can contain a water-soluble organic solvent having an equilibrium moisture content of less than 30% by mass under the conditions of 23° C. in temperature and 80% RH in humidity (referred to as "water-soluble organic solvent B", hereinafter), instead of the water-soluble organic solvent A, or in combination with the water-soluble organic solvent A.

Examples of such water-soluble organic solvent B include polyhydric alcohols, polyhydric alcohol alkyl ethers, polyhydric alcohol aryl ethers, nitrogen-containing heterocyclic compounds, amides, amines, sulfur-containing compounds, propylene carbonates, ethylene carbonates, and other water-soluble organic solvents.

Specific examples of the polyhydric alcohol of the water-soluble organic solvent B include dipropylene glycol (boiling point (BP): 232° C.), 1,5-pentanediol (BP: 242° C.), 3-methyl-1,3-butanediol (BP: 203° C.), propylene glycol (BP: 187° C.), 2-methyl-2,4-pentanediol (BP: 197° C.), ethylene glycol (BP: 196° C. to 198° C.), tripropylene glycol (BP: 267° C.), hexylene glycol (BP: 197° C.), polyethylene glycol (viscous fluid to solid), polypropylene glycol (BP: 187° C.), 1,6-hexanediol (BP: 253-260° C.), 1,2,6-hexanetriol (BP: 178° C.), trimethylol ethane (solid, melting point (MP): 199° C. to 201° C.), and trimethylol propane (solid, MP: 61° C.).

Examples of the aforementioned polyhydric alcohol alkyl ethers include ethylene glycol monoethyl ether (BP: 135° C.), ethylene glycol monobutyl ether (BP: 171° C.), diethylene glycol monomethyl ether (BP: 194° C.), diethylene glycol monoethyl ether (BP: 197° C.), diethylene glycol monobutyl ether (BP: 231° C.), ethylene glycol mono-2-ethylhexyl ether (BP: 229° C.), and propylene glycol monoethyl ether (BP: 132° C.).

Examples of the aforementioned polyhydric alcohol aryl ethers include ethylene glycol monophenyl ether (BP: 237° C.), and ethylene glycol monobenzyl ether.

Examples of the aforementioned nitrogen-containing heterocycloc compounds include 2-pyrrolidone (BP: 250° C., MP: 25.5° C., EMC: 47% by mass to 48% by mass), N-methyl-2-pyrrolidone (BP: 202° C.), 1,3-dimethyl-2-imidazolidinone (BP: 226° C.), ε-caprolactam (BP: 270° C.), and γ-butyrolactone (BP: 204° C. to 205° C.).

Examples of the aforementioned amides include formamide (BP: 210° C.), N-methylformamide (BP: 199° C. to 201° C.), N,N-dimethylformamide (BP: 153° C.), and N,N-diethylformamide (BP: 176° C. to 177° C.).

Examples of the aforementioned amines include monoethanol amine (BP: 170° C.), diethanol amine (BP: 268° C.), triethanol amine (BP: 360° C.), N,N-dimethylmonoethanol amine (BP: 139° C.), N-methyldiethanol amine (BP: 243° C.), N-methylethanol amine (BP: 159° C.), N-phenylethanol amine (BP: 282° C. to 287° C.), and 3-aminopropyldiethyl amine (BP: 169° C.).

Examples of the aforementioned sulfur-containing compounds include dimethyl sulfoxide (BP: 139° C.), sulfolane (BP: 285° C.), and thiodiglycol (BP: 282° C.).

Moreover, a solid moisturizer can be used in combination with the aforementioned water-soluble organic solvents, and preferable examples of such solid moisturizer include saccharides.

Examples of the aforementioned saccharides include mono saccharides, di saccharides, oligosaccharides (including trisaccharides, and tetrasaccharides), and polysaccharides. Specific examples thereof include glucose, mannose, fructose, ribose, xylose, arabinose, galactose, maltose, cellobiose, lactose, sucrose, trahalose, and maltotriose.

Here, "polysaccharide" means sugar in a broad sense, and include compounds widely present in the nature, such as α-cyclodextrin, and cellulose. Moreover, examples of derivatives of these saccharides include reducing sugars (e.g. sugar alcohol represented by the general formula: $HOCH_2(CHOH)_n CH_2OH$ (n is an integer of 2 to 5)), sugar acids (e.g. aldonic acid, and uronic acid), amino acids, and thio acids. Among them, sugar alcohol is particularly preferable, and specific examples thereof include maltitol, and sorbitol.

The amount of the water-soluble organic solvent contained in the liquid composition is not particularly restricted, but it is generally 10% by mass to 80% by mass, preferably 15% by mass to 60% by mass. These ranges include all specific values and subranges therebetween, including When the amount thereof is more than 80% by mass, there is a possibility that the drying speed of the resulting liquid composition deposited on a recording medium may be slow depending on the type of the water-soluble organic solvent used. When the amount of the water-soluble organic solvent is less than 10% by mass, the water contained in the liquid composition is easily evaporated, which increases the viscosity of the liquid composition and hence causes problems during a coating process.

Other Components

Other components added to the liquid composition of the present invention will be explained below. The liquid composition of the present invention contains a certain organic acid, a certain amine, a water-soluble organic solvent, and water, and may further contain a metal salt compound of organic acid, an inorganic metal salt compound of organic acid, a surfactant, a penetrating agent, and the like.

Metal Salt Compound of Organic Acid and Inorganic Metal Salt Compound

The liquid composition of the present invention may contain a metal salt compound of an organic acid and/or inorganic metal salt compound for the purpose of enhancing acid deposition to thereby increase density of a resulting image to be recorded. In this case, an amount of the metal salt compound of an organic acid or inorganic metal salt compound is preferably 0.1% by mass to 10% by mass, more preferably 0.5% by mass to 5% by mass relative to the total amount of the liquid composition. These ranges include all specific values and subranges therebetween, including 0.2, 1, 2 and 8% by mass.

When the amount thereof is more than 10% by mass, the metal salt compound or inorganic salt compound of the organic acid may not be sufficiently dissolved to thereby precipitate in the liquid composition. When the amount thereof is less than 0.1% by mass, an obtainable effect of improving density of an image may be small.

Examples of the metal salt compound of the organic acid include monosodium L-aspartate, magnesium L-aspartate, calcium ascorbate, sodium L-ascorbate, sodium succinate, disodium succinate, diammonium succinate, aluminum citrate, potassium citrate, calcium citrate, triammonium citrate, tripotassium citrate, trisodium citrate, diammonium citrate, disodium citrate, zinc lactate, aluminum lactate, ammonium lactate, potassium lactate, calcium lactate, sodium lactate, magnesium lactate, potassium tartrate, calcium tartrate, sodium DL-tartrate, and sodium potassium tartrate.

Examples of the inorganic metal salt compound include magnesium sulfate, aluminum sulfate, manganese sulfate, nickel sulfate, iron(II) sulfate, copper (II) sulfate, zinc sulfate, iron(II) nitrate, iron(III) nitrate, cobalt nitrate, strontium nitrate, copper(II) nitrate, nickel(II) nitrate, zinc(II) nitrate, manganese (II) nitrate, calcium nitrate, nickel(II) chloride, calcium chloride, tin(II) chloride, strontium chloride, barium chloride, and magnesium chloride.

Surfactant

The liquid composition of the present invention may contain a surfactant for the purpose of improving wetting ability of a recording medium to thereby increase image density and saturation of a recorded matter and prevent formation of white spots (blank spots left in the imaging part of the recorded matter) in the image. In this case, an amount of the surfactant is preferably 0.001% by mass to 5% by mass, more preferably 0.05% by mass to 2% by mass relative to the total amount of the liquid composition. These ranges include all specific values and subranges therebetween, including 0.005, 0.01, 0.02, 0.1, 0.5, 1 and 3% by mass.

When the amount of the surfactant is less than 0.001% by mass, an obtainable effect by adding the surfactant may be small. When the amount of the surfactant is more than 5% by mass, any improvement cannot be attained in enhancing the effect of the surfactant by increasing the amount to be added. Note that, in the case where the surfactant is used in the liquid composition, it is preferred that the surface tension of the liquid composition be controlled to be 30 mN/m or lower, using the surfactant.

The surfactant is preferably at least one selected from the group consisting of a fluoro surfactant, a nonionic surfactant, anionic surfactant, a betaine surfactant, and a silicone surfactant is preferably used, more preferably at least one selected from the fluorosurfactant or silicone surfactant. These surfactants may be used independently or in combination.

The aforementioned fluoro surfactant has the number of the carbon atoms substituted with a fluorine atom of preferably 2 to 16, more preferably 4 to 16. When the numbers of the carbon atoms substituted with a fluorine atom are less than 2, such fluorosurfactant may not give any effect. When the numbers thereof are more than 16, problems may occur in storage stability of the liquid composition.

Examples of the fluorosurfactant include perfluoroalkyl sulfonic acid compounds, perfluoroalkyl carboxylic acid compounds, perfluoroalkyl phosphoric acid ester compounds, perfluoroalkylethylene oxide adducts, and polyoxyalkylene ether polymer compounds each having a perfluoroalkyl ether group at side chain. Among them, the polyoxyalkylene ether polymer compound having a perfluoroalkyl ether group at side chain is preferable because it has low foaming property, and the fluorosurfactant represented by the following formula (f-1) is particularly preferable.

$$CF_3CF_2(CF_2CF_2)_m\text{---}CH_2CH_2O(CH_2CH_2O)_nH \quad (f\text{-}1)$$

In the formula (f-1), m is an integer of 0 to 10, and n is an integer of 1 to 40.

Examples of the aforementioned perfluoroalkyl sulfonic acid compound include perfluoroalkyl sulfonic acid, and a salt of perfluoroalkyl sulfonic acid. Examples of the aforementioned perfluoroalkyl carboxylic acid compound include perfluoroalkyl carboxylic acid, and a salt of perfluoroalkyl carboxylic acid. Examples of the aforementioned perfluoroalkyl phosphoric acid ester compound include perfluoroalkyl phosphoric acid ester and a salt of perfluoroalkyl phosphoric acid ester.

Examples of the aforementioned polyoxyalkylene ether polymer compound having a perfluoroalkyl ether group at side chain include polyoxyalkylene ether polymer having a perfluoroalkyl ether group at side chain thereof, a sulfuric ester salt of polyoxyalkylene ether having a perfluoroalkyl ether group at side chain thereof, and a salt of polyoxyalkylene ether polymer having a perfluoroalkyl ether group at side chain thereof.

Examples of a counter ion of the salt of these fluorosurfactants include Li, Na, K, $NH_4$, $NH_3CH_2CH_2OH$, $NH_2(CH_2CH_2OH)_2$, and $NH(CH_2CH_2OH)_3$.

The fluorosurfactant may be selected from those appropriately synthesized or commercial products. Examples of the commercial products include: SURFLON S-111, S-112, S-113, S-121, S-131, S-132, S-141, S-145 (all manufactured by AGC SEIMI CHEMICAL CO., LTD); FLOURAD FC-93, FC-95, FC-98, FC-129, FC-135, FC-170C, FC-430, FC-431 (all manufactured by Sumitomo 3M Limited); MEGAFACE F-470, F-1405, F-474 (all manufactured by DIC Corporation); ZONYL TBS, FSP, FSA, FSN-100, FSN, FSO-100, FSO, FS-300, UR (all manufactured by Du Pont Kabushiki Kaisha); FT-110, FT-250, FT-251, FT-400S, FT-150, FT-400SW (all manufactured by NEOS COMPANY LIMITED); PolyFox PF-136A, PF-156A, PF-151N, PF-154, PF-159(all manufactured by Omnova Solutions, Inc). Among them, FS-300 of Du Pont Kabushiki Kaisha, FT-110, FT-250, FT-251, FT-400S, FT-150, and FT-400SW of NEOS COMPANY LIMITED, and PolyFox PF-151N of Omnova Solutions, Inc. are particularly preferable because use thereof helps to obtain excellent printing quality, especially saturation, and significantly improves level dying to paper.

As other examples of the fluorosurfactant, those represented by the following formulae (f-2) to (f-10) are preferable.

(1) Anionic Fluorosurfactant

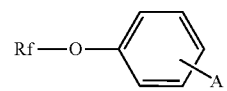
(f-2)

In the formula (f-2), Rf represents a mixture of a fluorine-containing hydrophobic groups represented by the formula (f-2a); A is $-SO_3X$, $-COOX$, or $-PO_3X$, where X represents a counter ion, specifically, a hydrogen atom, Li, Na, K, $NH_4$, $NH_3CH_2CH_2OH$, $NH_2(CH_2CH_2OH)_2$, or $NH(CH_2CH_2OH)_3$.

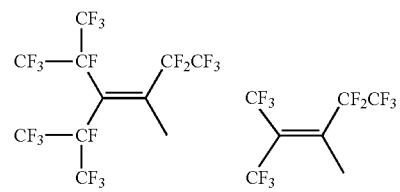
(f-2a)

(f-3)

In the formula (f-3), Rf' represents a fluorin-containing group represented by the formula (f-3a); X is the same as in the formula (f-2); n is an integer of 1 or 2; and m is 2-n.

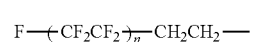
(f-3a)

In the formula (f-3a), n is an integer of 3 to 10.

$$Rf'\text{-S}\text{---}CH_2CH_2\text{---}COO.X \quad (f\text{-}4)$$

In the formula (f-4), X is the same as in the formula (f-2), and Rf' is the same as in the formula (f-3).

$$Rf'\text{-}SO_3.X \quad (f\text{-}5)$$

In the formula (f-5), X is the same as in the formula (f-2), and Rf' is the same as in the formula (f-3).

(2) Nonionic Fluorosurfactant

(f-6)

In the formula (f-6), Rf is the same as in the formula (f-2), and n is an integer of 5 to 20.

(f-7)

In the formula (f-7), Rf' is the same as in the formula (f-3), and n is an integer of 1 to 40.

(3) Amphoteric Fluorosurfactant

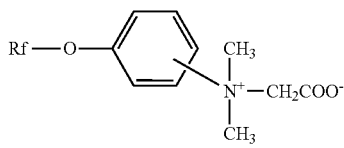
(f-8)

In the formula (f-8), Rf is the same as in the formula (f-2).

(4) Oligomer Fluorosurfactant

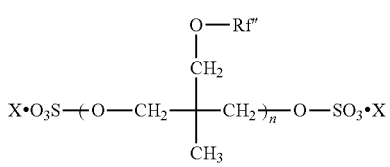
(f-9)

In the formula (f-9), Rf″ is the fluorine-containing group represented by the formula (f-9a); n is an integer of 0 to 10; and X is the same as in the formula (f-2).

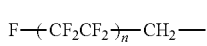
(f-9a)

In the formula (f-9a), n is an integer of 1 to 4.

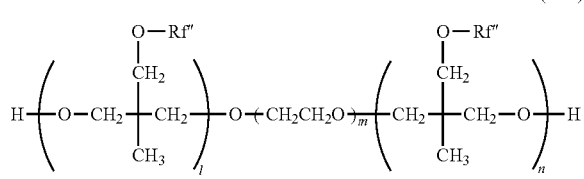
(f-10)

In the formula (f-10), Rf″ is the same as in the formula (f-9); l is an integer of 0 to 10; m is an integer of 0 to 10; and n is an integer of 0 to 10.

The silicone surfactant is suitably selected depending on the intended purpose without any restriction, and examples thereof include side chain-modified polydimethylsiloxane, both terminals-modified polydimethylsiloxane, one terminal-modified polydimethylsiloxane, and side chain and both terminals-modified polydimethylsiloxane. The polyether-modified silicone surfactant having a polyoxyethylene group, and a polyoxyethylene polyoxypropylene group is particularly preferable because it has excellent properties as an aqueous surfactant. The polyether-modified silicone surfactant is suitably selected depending on the intended purpose without any restriction.

Examples thereof include a compound in which the polyalkylene oxide structure represented by the formula (si-1) is introduced to a Si portion of a side chain of dimethylpolysiloxane.

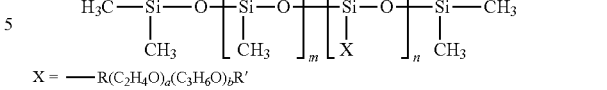
(si-1)

In the formula (si-1), m, n, a, and b each represent an integer; and R and R' each represent an alkyl group or an alkylene group.

Such silicone surfactant may be selected from those appropriately synthesized or commercial products. As the commercial products, for example, silicone surfactants manufactured by BYK Japan K.K., Shin-Etsu Chemical Co., Ltd., Dow Corning Toray Co., Ltd., Nihon Emulsion Co., Ltd., and Kyoeisha Chemical Co., Ltd. are readily available. Specific examples of the commercial products of the polyether-modified silicone surfactant include: KF-618, KF-642, and KF-643 (Shin-Etsu Chemical Co., Ltd.); EMALEX-SS-5602, and SS-1906EX (Nihon Emulsion Co., Ltd.); FZ-2105, FZ-2118, FZ-2154, FZ-2161, FZ-2162, FZ-2163, and FZ-2164 (Dow Corning Toray Co., Ltd.); and BYK-33, and BYK-387 (BYK Japan K.K.).

Examples of the aforementioned anionic surfactant include an acetic acid salt of polyoxyethylene alkylether, dodecylbenzene sulfonic acid salt, succinic ester sulfonic acid salt, lauryl acid salt, and a salt of polyoxyethylene alkyl ether sulfate. Examples of the aforementioned nonionic surfactant include polyoxyethylene alkyl ether, polyoxypropylene polyoxyethylene alkyl ether, polyoxyethylene alkyl ester, polyoxyethylene sorbitan fatty acid ester, polyoxyethylene alkylphenyl ether, polyoxyethylene alkylamine, and polyoxyethylene alkyl amide.

Penetrating Agent

The liquid composition of the present invention preferably contains at least one selected from the group consisting of a non-wettable C8-11 polyol compound and a glycol ether compound, as a penetrating agent. In this case, the amount of the penetrating agent contained in the liquid composition is preferably 0.1% by mass to 5.0% by mass.

When the amount thereof is less than 0.1% by mass, the penetrating agent may not give the effect of making the liquid composition penetrate. When the amount thereof is more than 5.0% by mass, part of the penetrating agent is separated from the solvent as the penetrating agent has low solubility to the solvent, and therefore the effect of improving penetration of the liquid composition may be saturated.

The penetrating agent is preferably selected from those having a solubility of 0.2% by mass to 5.0% by mass to water of 25° C. Among them, 2-ethyl-1,3-hexanediol [solubility: 4.2% (25° C.)], and 2,2,4-trimethyl-1,3-pentanediol [solubility: 2.0% (25° C.)] are particularly preferable.

Other examples of the non-wettable polyol compound include aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, and 5-hexane-1,2-diol. Other penetrating agents that can be used in combination with those mentioned above are suitably selected depending on the intended purpose without any restriction, provided that they can be dissolved in the liquid composition to thereby control the liquid composition to have the desirable properties. Examples thereof include: alkyl or aryl ether of polyhydric alcohol such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, and tetraethylene glycol chlorophenyl ether; and lower alcohol such as ethanol.

Note that, the liquid composition of the present invention may optionally contain an antiseptic agent, an anti-rust agent, and the like, which are generally used in common inks.

Ink

Next, an ink for use in the recording method of the present invention will be explained.

The ink for use in the recording method of the present invention contains a water-dispersible coloring agent, a water-soluble organic solvent, a surfactant, a penetrating agent, and water.

A color of the ink is suitably selected depending on the intended purpose without any restriction. Examples thereof include yellow, magenta, cyan, and black. Use of an ink-set containing two or more inks of these colors realizes recording of color images, and use of an ink-set containing inks of at least three colors realizes recording of full-color images.

The ink is suitably used in an inkjet recording method using a recording device, such as a so-called piezo-type recording device (see JP-A No. 02-51734), a so-called thermal-type recording device (see JP-A No. 61-59911), and a so-called electrostatic-type recording device (see JP-A No. 06-71882). Moreover, this ink is also suitably used in a recording device having a function to heat a recording medium and the ink at certain temperature during, or before and after the recording to accelerate fixation of a recorded matter.

The physical properties of the ink are suitably selected depending on the intended purpose without any restriction. For example, the viscosity, surface tension, and the like of the ink are preferably within the following ranges.

The viscosity of the ink is preferably 5 mPa·s to 20 mPa·s at 25° C. By adjusting the viscosity of the ink to 5 mPa·s or more, density and quality of an image to be recorded can be improved. By adjusting the viscosity of the ink to 20 mPa·s or less, moreover, the ink can attain excellent jetting stability. Here, the viscosity of the ink can be measured at 25° C. by means of a viscometer (e.g. RE-550L, manufactured by TOKI SANGYO CO., LTD.).

The surface tension of the ink is preferably 20 mN/m to 35 mN/m, more preferably 20 mN/m to 30 mN/m at 25° C. When the surface tension of the ink is in the range of 20 mN/m to 35 mN/m, penetration ability of the ink increases, and the ink has excellent drying properties even when it is used for printing on plain paper, and hence occurrences of color bleeding reduce. Moreover, the ink of such surface tension easily wets the deposition part of the liquid composition on a recording medium, to thereby increase saturation of a recorded matter as well as preventing occurrences of white spots. When the surface tension thereof is higher than 35 mN/m, it is difficult to level the ink (i.e. to immediately uniformly wet a surface of a recording medium with the ink) on a recording medium, and hence drying speed may be prolonged.

Water-Dispersible Coloring Agent

As the water-dispersible coloring agent of the ink, a pigment is used mainly in view of weather resistance, but a dye may be used in combination for the purpose of adjusting a color tone of the ink, provided that it does not reduce the weather resistance of the ink. The pigment is suitably selected depending on the intended purpose without any restriction.

Examples thereof include an inorganic pigment for black color, or color, and an organic pigment for black color, or color. These pigments may be used independently or in combination. An amount of the water-dispersible coloring agent contained in the ink is preferably 2% by mass to 15% by mass, more preferably 3% by mass to 12% by mass based on the solid content thereof.

When the amount thereof is less than 2% by mass, saturation or density of a resulting recorded matter may be low. When the amount thereof is more than 15% by mass, the viscosity of the ink increases to thereby lower jetting stability of the ink. Here, the solid content of the ink is measured, for example by a method in which the water-dispersible coloring agent and the water-dispersible resin are separated from the ink.

In the case where the pigment is used as the water-dispersible coloring agent, a ratio of the coloring agent and the water-dispersible resin is measured by evaluating a mass loss rate by thermo mass spectrometry. Moreover, in the case where a molecular structure of the water-dispersible coloring agent is known, solid content of the coloring agent in case of the pigment or dye can be determined by nuclear magnetic resonance (NMR), and solid content of the coloring agent in case of the inorganic pigment containing a heavy metal atom in its molecular skeleton, metal-containing organic pigment, and metal-containing dye can be determined by X-ray fluorescence spectrometry.

As the aforementioned inorganic pigment, carbon black produced by the conventional methods known in the art such as a contact method, a furnace method, and a thermal method, as well as titanium oxide, iron oxide, calcium carbonate, barium sulfate, aluminum hydroxide, barium yellow, cadmium red, and chrome yellow can be used.

Examples of the aforementioned organic pigment include azo pigments (e.g., azo lake, an insoluble azo pigment, a condensed azo pigment, and a chelate azo pigment), polycyclic pigments (e.g., a phthalocyanine pigment, a perylene pigment, a perinone pigment, an anthraquinone pigment, a quinacridon pigment, a dioxazine pigment, an indigo pigment, a thioindigo pigment, an iso-indolinone pigment, and a quinophtharone pigment), dye chelate (e.g., basic dye chelate, and acid dye chelate), a nitro pigment, a nitroso pigment, and aniline black. Among these pigments, those having good compatibility to water are particularly preferably used.

Specific examples of the preferable pigment for black include: carbon black (C.I. Pigment Black 7) such as furnace black, lamp black, acetylene black, and channel black; metals such as copper, iron (C.I. Pigment Black 11), and titanium oxide; and organic pigments such as aniline black (C.I. Pigment Black 1). Examples of the preferable pigment for color include: C.I. Pigment Yellow 1, 3, 12, 13, 14, 17, 24, 34, 35, 37, 42 (yellow oxide), 53, 55, 74, 81, 83, 95, 97, 98, 100, 101, 104, 408, 109, 110, 117, 120, 128, 138, 150, 151, 153, 183; C.I. Pigment Orange 5, 13, 16, 17, 36, 43, 51; C.I. Pigment Red 1, 2, 3, 5, 17, 22, 23, 31, 38, 48:2, 48:2 (Parmanent Red 2B(Ca)), 48:3, 48:4, 49:1, 52:2, 53:1, 57:1 (brilliant carmine 6B), 60:1, 63:1, 63:2, 64:1, 81, 83, 88, 101 (iron red), 104, 105, 106, 108 (cadmium red), 112, 114, 122 (quinacridon magenta), 123, 146, 149, 166, 168, 170, 172, 177, 178, 179, 185, 190, 193, 209, 219; C.I. Pigment Violet 1 (rhodamine lake), 3, 5:1, 16, 19, 23, 38; C.I. Pigment Blue 1, 2, 15, 15:1, 15:2, 15:3 (phthalocyanine blue), 16, 17:1, 56, 60, 63; and C.I. Pigment Green 1, 4, 7, 8, 10, 17, 18, 36.

In the case where the water-dispersible coloring agent is the pigment, an embodiment for dispersing the pigment in water is preferably selected from the following first and second embodiments.

In the first embodiment, a dispersoid which is polymer particles each containing a water-insoluble or low water-soluble coloring agent (e.g. a resin-coated pigment) is dispersed in a dispersion medium which is water to thereby form a polymer emulsion (e.g. an aqueous dispersion liquid of polymer particles each containing a coloring agent).

In the second embodiment, a pigment having at least one hydrophilic group on the surface thereof, and exhibiting water-dispersibility without a dispersing agent (also referred to as "self-dispersible pigment" hereinafter) is dispersed in water.

Examples of the polymer emulsion used in the first embodiment include those having a pigment encapsulated in each polymer particle, and those having a pigment adsorbed on a surface of each polymer particle. In this case, it is not necessary that all of the particles of the pigment be encapsulated or adsorbed, and some particles of the pigment may be dispersed in the emulsion, provided that they adversely affect the obtainable effect of the present invention. Examples of the polymer for forming the polymer emulsion (i.e. the polymer of the polymer particles) include vinyl-based polymer, polyester-based polymer, and polyurethane-based polymer. The vinyl-based polymer, and the polyester-based polymer are particularly preferably used, and those polymers disclosed in JP-A Nos. 2000-53897, and 2001-139849 can be used.

The self-dispersible pigment for use in the second embodiment is a pigment each surface of particles of which is modified by bonding at least one hydrophilic group directly or via other atomic group to the surface thereof. As a method for this surface modification, a method in which a predetermined functional group (a functional group such as a sulfone group, carboxyl group, and the like) is chemically bonded t the surface of each particle of the pigment, or a wet oxidation process using hypohalous acid or a salt thereof is used.

Among these methods, a method in which a carboxyl group is bonded to a surface of each particle of a pigment, and the pigment is then dispersed in water is particularly preferable. By bonding the carboxyl group to a surface of each particle of the pigment, dispersion stability of the pigment improves, high quality images can be provided by the resulting ink, and water resistance of a recording medium after recording improves. Moreover, as the ink containing the self-dispersible pigment of the second embodiment has excellent re-dispersibility after being dried, and thus it does not cause clogging of an nozzle of a recording device even when moisture of the ink filled in the nozzle is evaporated, and excellent printing can be easily performed after a simple cleaning operation. To attain such characteristics of the ink, a volume average particle diameter ($D_{50}$) of the self-dispersible pigment is preferably 0.01 μm to 0.16 μm in the ink. Here, "$D_{50}$" is also called a median diameter, and means a diameter of particles by which the particles are divided into two groups, and an amount of the large group and an amount of the small group are equal. Note that, in the case where the self-dispersible pigment of the second embodiment is used, it is preferred that the ink contain a water-dispersible resin, which will be explained later, for the purpose of improving abrasion resistance and water resistance of the ink.

When the self-dispersible pigment is self-dispersible carbon black, it is preferably ionic self-dispersible carbon black, more preferably anionic self-dispersible carbon black. In the case of the anionic self-dispersible carbon black, examples of an anionic functional group carbon black bonded to the carbon black include —COOM, —$SO_3M$, —$PO_3HM$, —$PO_3M_2$, —$SO_2NH_2$, and —$SO_2NHCOR$, where M is alkali metal, ammonium or organic ammonium; and R is a C1-12 alkyl group, a substituted or unsubstituted phenyl group, or a substituted or unsubstituted naphthyl group. Among them, —COOM, and —$SO_3M$ are preferable. In the case where "M" in the aforementioned functional group is alkali metal, examples of such alkali metal include lithium, sodium, and potassium. In the case where "M" in the aforementioned functional group is organic ammonium, examples of such organic ammonium include mono-, di-, or trimethyl ammonium, mono-, di-, or triethyl ammonium, and mono-, di-, or trimethanol ammonium. The functional group may be bonded to the surface of the carbon black via other atomic groups. Examples of such atomic group include a C1-12 alkyl group, a substituted or unsubstituted phenyl group, and a substituted or unsubstituted naphthyl group. Specific examples of the functional group bonded to the surface of the carbon black via the atomic group include —$C_2H_4COOM$ (M is alkali metal or quaternary ammonium), and -$PhSO_3M$ (Ph is a phenyl group, and M is alkali metal or quaternary ammonium).

In the case where the self-dispersible pigment is a self-dispersible color pigment, it is preferably an ionic self-dispersible color pigment, more preferably an anionic self-dispersible color pigment. In this case, for attaining a color pigment having an anionic functional group, the anionic functional group (e.g. —COONa) can be introduced to a surface of each particle of the color pigment, for example, by a method in which a color pigment is subjected to oxidation treatment with sodium hypochlorite, a method by sulfonation, or a method to react with diazonium salt.

Water-Soluble Organic Solvent

As a water-soluble organic solvent for use in the ink, the water-soluble organic solvent for the liquid composition is suitably used. A mass ratio of the water-dispersible coloring agent to the water-soluble organic solvent in the ink affects jetting stability of the ink jetted from a head. For example, when a small amount of the water-soluble solvent is formulated into the ink even though the solid content of the water-dispersible coloring agent is high, moisture is encouraged to evaporate adjacent to an ink meniscus of a nozzle, which may cause jet failures.

An amount of the water-soluble organic solvent contained in the ink is preferably 20% by mass to 50% by mass, more preferably 20% by mass to 45% by mass. These ranges include all specific values and subranges therebetween, including 25, 30, 35 and 40% by mass.

When the amount thereof is less than 20% by mass, jetting stability of the resulting ink may be low, or waste ink may be deposited and solidified in a retainer of a recording device. When the amount thereof is more than 50% by mass, drying properties of the ink may be low on paper, and moreover quality of a resulting recorded matter may be low.

Surfactant

As a surfactant for use in the ink, the surfactant used in the liquid composition of the present invention is suitably used. Among the surfactants mentioned in the description of the liquid composition, those having low surface tension, high penetrating ability, and high leveling ability without adversely affecting dispersion stability in combination with the water-dispersible coloring agent or water-soluble organic solvent for use are suitably selected. Specifically, at least one selected from the group consisting of an anionic surfactant, a nonionic surfactant, a silicone surfactant, and a fluorosurfactant is suitably used. Among them, the silicone surfactant and the fluorosurfactant are particularly preferable.

These surfactants may be used independently or in combination. An amount of the surfactant contained in the ink is preferably 0.01% by mass to 3.0% by mass, more preferably 0.5% by mass to 2.0% by mass. These ranges include all specific values and subranges therebetween, such as 0.02, 0.05, 0.1, 0.2, 1, 1.5 and 2.5% by mass.

When the amount thereof is less than 0.01% by mass, an obtainable effect by adding the surfactant may not be sufficient. When the amount thereof is more than 3.0% by mass, penetrating ability of the ink to a recording medium is excessively high, which may lower density of an image to be recorded, or cause show through (the ink deposited on and penetrated into a recording medium reaches the back surface of the recording medium from the recording surface, or the ink is recognized visually or by a certain device).

Penetrating Agent

As a penetrating agent for use in the ink, the penetrating agent used for the liquid composition of the present invention is suitably used. An amount of the penetrating agent contained in the ink is preferably 0.1% by mass to 4.0% by mass.

When the amount of the penetrating agent is less than 0.1% by mass, the drying property of the ink reduces, and thus bleeding may occur. When the amount of the penetrating agent is more than 4.0% by mass, the ink may lose the dispersion stability of the coloring agent, which tends to cause clogging of a nozzle of a recording device, or penetrating ability of the ink to a recording medium is excessively high, which may lower the density of the recorded matter, or cause show through.

Water-Dispersible Resin

A water-dispersible resin is used to enhance water-proof properties or water resistance, weather resistance, density or saturation of the recorded image by forming a film on a surface of the recorded matter where the ink was deposited. The water-dispersible resin may be a composite resin formed of a homopolymer and/or copolymer, or single-phase, core-shell, or power field emulsion.

Moreover, as the water-dispersible resin, either a self-dispersible resin in which the resin itself has hydrophilic groups, or a dispersible resin in which the resin itself does not have dispersibility, and the dispersibility is provided by a surfactant or a resin having hydrophilic groups can be used. Examples of the water-dispersible resin include a condensation synthetic resin, an addition synthetic resin, and a natural polymer compound.

Examples of the aforementioned condensation synthetic resin include polyester resins, polyurethane resins, polyepoxy resins, polyamide resins, polyether resins, poly(meth)acrylic resins, acryl-silicone resins, and fluororesins. Examples of the aforementioned addition synthetic resin include polyolefin resins, polystyrene resins, polyvinyl alcohol resins, polyvinyl ester resins, polyacrylic acid resins, and unsaturated carboxylic acid resins. Examples of the aforementioned natural polymer compound include cellulose, rosin, and natural rubber. Among them, polyurethane resin particles, acryl-silicone resin particles, and fluororesin particles are particularly preferable. Moreover, two or more resins may be used in combination as the water-dispersible resin.

As the fluororesin, fluororesin particles having fluoroolefin unit are preferable. Among them, fluorine-containing vinyl ether resin particles formed of a fluoroolefin unit and a vinyl ether unit are particularly preferable. The fluoroolefin unit is suitably selected depending on the intended purpose without any restriction. Examples thereof include —CF$_2$CF$_2$—, —CF$_2$CF(CF$_3$)—, and —CF$_2$CFCl—. The vinyl ether unit is suitably selected depending on the intended purpose without any restriction. Examples thereof include the compounds represented by the following structural formulae.

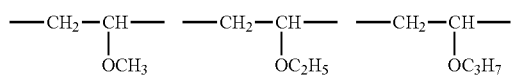

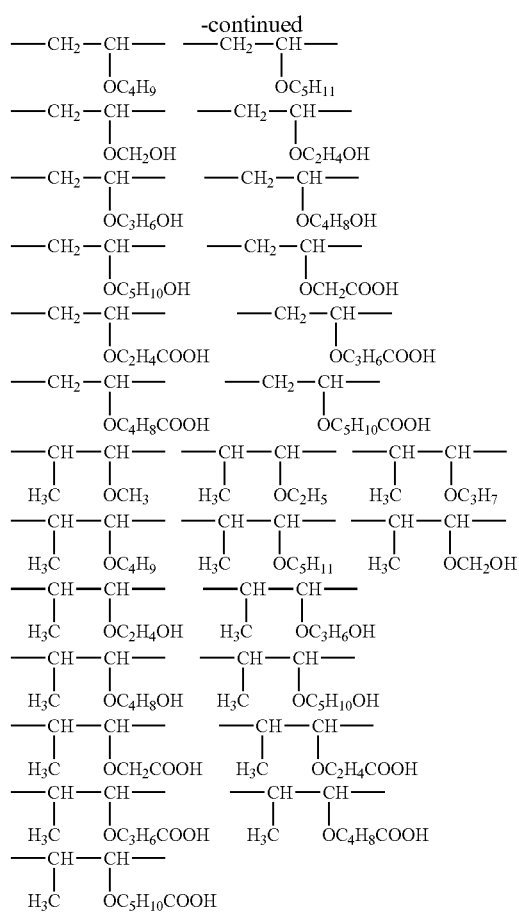

The fluorine-containing vinyl ether resin particles formed of the fluoroolefin unit and the vinyl ether unit are preferably particles of an alternating copolymer in which the fluoroolefin unit and the vinyl ether unit are alternately copolymerized. Such fluororesin particles may be selected from those appropriately synthesized, or commercial products for use. Examples of the commercial products thereof include: FLUONATE FEM-500, FEM-600, DIC GUARD F-52S, F-90, F-90M, F-90N, AQUAFURFURAN TE-5A, manufactured by DIC Corporation; LUMIFLON FE4300, FE4500, FE4400, AsahiGuard AG-7105, AG-950, AG-7600, AG-7000, AG-1100, manufactured by ASAHI GLASS CO., LTD.

Moreover, as the water-dispersible resin, resin particles formed by emulsification polymerization or suspension polymerization of an ionomer or unsaturated monomer of polyester resin or polyurethane resin are suitably used. In the case where emulsification polymerization of an unsaturated monomer is performed to obtain such resin particles, the unsaturated monomer, a polymerization initiator, a surfactant, a chain transfer agent, a chelating agent, a pH regulator, and the like are added to water, and the mixture is allowed to react to obtain a resin emulsion. In this manner, a water-dispersible resin is easily produced. In such case, moreover, components constituting the resin are easily optimized so that a water-dispersible resin of intended characteristics can be produced. Examples of the unsaturated monomer include unsaturated carboxylic acid monomers, monofunctional or polyfunctional (meth)acrylate monomers, (meth)acrylic acid amide monomers, aromatic vinyl monomers, vinylcyano compound monomers, vinyl monomers, allyl compound monomers, olefin monomers, diene monomers, and oligomers having carbon-carbon unsaturated bonds. These may be used independently or in combination. By combining these monomers, characteristics of the water-dispersible resin to be produced are easily changed. Moreover, the properties of the resin can also be changed by performing polymerization reaction or graft reaction using an oligomer polymerization initiator as the aforementioned polymerization initiator.

Examples of the unsaturated carboxylic acid monomer as the unsaturated monomer include acrylic acid, methacrylic acid, itaconic acid, fumaric acid, and maleic acid. Examples of the monofunctional (meth)acrylate monomer as the unsaturated monomer include methylmethacrylate, ethylmethacrylate, isopropylmethacrylate, n-butylmethacrylate, isobutylmethacrylate, n-amylmethacrylate, isoamylmethacrylate, n-hexylmethacrylate, 2-ethylhexylmethacrylate, octylmethacrylate, decylmethacrylate, dodecylmethacrylate, octadecylmethacrylate, cyclohexylmethacrylate, phenylmethacrylate, benzylmethacrylate, glycidylmethacrylate, 2-hydroxyethylmethacrylate, 2-hydroxypropylmethacrylate, dimethylaminoethylmethacrylate, methacryloxyethyltrimethyl ammonium salt, 3-methacryloxypropyltrimethoxysilane, methylacrylate, ethylacrylate, isopropylacrylate, n-butylacrylate, isobutylacrylate, n-amylacrylate, isoamylacrylate, n-hexylacrylate, 2-ethylhexylacrylate, octylacrylate, decylacrylate, dodecylacrylate, octadecylacrylate, cyclohexylacrylate, phenylacrylate, benzylacrylate, glycidylacrylate, 2-hydroxyethylacrylate, 2-hydroxypropylacrylate, dimethylaminoethylacrylate, and acryloxyethyltrimethyl ammonium salt.

Examples of the polyfunctional (meth)acrylate monomer as the unsaturated monomer include ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentylglycol dimethacrylate, dipropylene glycol dimethacrylate, polypropylene glycol dimethacrylate, polybutylene glycol dimethacrylate, 2,2'-bis(4-methacryloxydiethoxyphenyl) propane, trimethylolpropane trimethacrylate, trimethylolethane trimethacrylate, polyethylene glycol diacrylate, triethylene glycol diacrylate, 1,3-butylene glycol diacrylate, 1,4-butylene glycol diacrylate, 1,6-hexanediol diacrylate, neopentylglycol diacrylate, 1,9-nonanediol diacrylate, polypropylene glycol diacrylate, 2,2'-bis(4-acryloxypropyloxyphenyl)propane, 2,2'-bis(4-acryloxydiethoxyphenyl) propanetrimethylolpropane triacrylate, trimethylolethane triacrylate, tetramethylolethane triacrylate, ditrimethylol tetraacrylate, tetramethylolmethane tetraacrylate, pentaerythritol tetraacrylate, and dipentaerythritol hexaacrylate.

Examples of the (meth)acrylic acid amide monomer as the unsaturated monomer include acryl amide, methacryl amide, N,N-dimethylacryl amide, methylene bisacryl amide, and 2-acryl amide-2-methylpropane sulfonic acid. Examples of the aromatic vinyl monomer as the unsaturated monomer include styrene, α-methylstyrene, vinyltoluene, 4-t-butylstyrene, chlorostyrene, vinyl anisole, vinyl naphthalene, and divinyl benzene. Examples of the vinylcyano compound monomer as the unsaturated monomer include acrylonitrile, and methacrylonitrile. Examples of the vinyl monomer as the unsaturated monomer include vinyl acetate, vinylidene chloride, vinyl chloride, vinyl ether, vinyl ketone, vinylpyrrolidone, vinyl sulfonate or salts thereof, vinyl trimethoxy silane, and vinyl triethoxy silane. Examples of the allyl compound monomer as the unsaturated monomer include allyl sulfonic acid and salts thereof, allylamine, allyl chloride, diallylamine, and diallyl dimethyl ammonium salt. Examples of the olefin monomer as the unsaturated monomer include ethylene, and propylene. Examples of the diene monomer as the unsaturated monomer include butadiene, and chloroprene. Examples of the oligomer having an unsaturated bond of a carbon atom as the unsaturated monomer include: a styrene oligomer having a methacryloyl group, a styrene-acrylonitrile oligomer having a methacryloyl group, a methylmethacrylate oligomer having a methacryloyl group, a dimethylsiloxane oligomer having a methacryloyl group, and a polyester oligomer having an acryloyl group.

The water-dispersible resin causes scission of the molecular chain due to dispersion breakage or hydrolysis under the strong alkaline or acidic condition. Therefore, the pH value of the water-dispersible resin before formulated into the ink is preferably 4 to 12, more preferably 6 to 11 in view of the compatibility to the water-dispersible pigment, and even more preferably 7 to 9. The average particle diameter ($D_{50}$) of the water-dispersible resin relates to viscosity of the dispersion liquid thereof, and the viscosity thereof increases as the particle diameter reduces, provided that the formulation and solid content of the dispersion liquid are the same. Accordingly, for preventing the viscosity of the resulting ink from becoming too high, the average particle diameter ($D_{50}$) of the water-dispersible resin is preferably 50 nm or larger. When the particle diameter thereof is approximately a several ten micrometers, the particles of the water-dispersible resin are bigger than an opening diameter of a nozzle of a head of a recording device. Larges particles of such diameter contained in the ink deteriorate jetting stability of the ink. Therefore, the average particle diameter ($D_{50}$) of the water-dispersible resin is preferably 200 nm or smaller, more preferably 150 nm or smaller for ensuring jetting stability of the resulting ink. Moreover, since the water-dispersible resin has a function of helping the water-dispersible coloring agent to fix on a recording medium, the water-dispersible resin is preferably capable of form a film at normal temperature. For this reason, a minimum film forming temperature (MFT) of the water-dispersible resin is preferably 30° C. or lower. When a glass transition temperature of the water-dispersible resin is lower than −40° C., viscosity of a resin film increases, which may give tackiness (i.e. tackiness of the dried ink) to the recorded matter. Therefore, the glass transition temperature of the water-dispersible resin is preferably −40° C. or higher, more preferably −30° C. or higher. An amount of the water-dispersible resin contained in the ink is preferably 1% by mass to 15% by mass, more preferably 2% by mass to 7% by mass based on the solid content thereof.

Other Substances

Other substances which can be added to the ink used for the recording method of the present invention will be explained next. Other substances are suitably selected depending on the intended purpose without any restriction, and examples thereof include a pH regulator, a preservative and fungicide, a chelating reagent, an anti-rust agent, an antioxidant, an ultraviolet absorber, an oxygen absorbent, and a photostabilizer.

pH Regulator

The pH regulator is suitably selected depending on the intended purpose without any restriction, provided that it does not adversely affect the resulting ink and it can adjust a pH value of the resulting ink to the range of 7 to 11. When the pH value of the ink is lower than 7, or higher than 11, the ink may dissolve a head or ink-supplying unit of a recording device to thereby change the properties of the ink or to cause leakages of the ink, which may cause problems such as jetting failures.

Examples of the pH regulator suitably used for the present invention include alcohol amines, alkali metal hydroxides, ammonium hydroxides, phosphonium hydroxides, and alkali metal carbonates.

Examples of alcohol amines include diethanol amine, triethanol amine, 2-amino-2-ethyl-1,3-propanediol.

Examples of alkali metal hydroxides include lithium hydroxide, sodium hydroxide, and potassium hydroxide.

Examples of ammonium hydroxides include ammonium hydroxide, and quaternary ammonium hydroxide. Examples of phosphonium hydroxide include quaternary phosphonium hydroxide.

Examples of alkali metal carbonates include lithium carbonate, sodium carbonate, and potassium carbonate.

—Preservative and Fungicide—

As the preservative and fungicide, for example, sodium dehydroacetate, sodium sorbate, sodium-2-pyridinethiol-1-oxide, sodium benzoate, sodium pentachlorophenol, and the like are suitably used.

Chelating Reagent

As the chelating reagent, for example, sodium ethylenediaminetetraacetate, sodium nitrilotriacetate, sodium hydroxyethylethylenediaminetriacetate, sodium diethylenetriaminepentaacetate, sodium uramildiacetate, and the like are suitably used.

Anti-Rust Agent

As the anti-rust agent, for example, acidic sulfite salt, sodium thiosulfate, ammonium thiodiglycolate, diisopropyl ammonium nitrite, pentaerythritol tetranitrate, dicyclohexyl ammonium nitrite, and the like are suitably used.

Antioxidant

As the antioxidant, for example, a phenol-based antioxidant (including a hindered pheno-based antioxidant), an amine-based antioxidant, a sulfur-based antioxidant, a phosphorous-based antioxidant, and the like are suitably used.

Ultraviolet Absorber

As the ultraviolet absorber, for example, a benzophenone-based ultraviolet absorber, a benzotriazol-based ultraviolet absorber, a salicylate-based ultraviolet absorber, a cyano acrylate-based ultraviolet absorber, a nickel complex salt-based ultraviolet absorber, and the like are suitably used.

Preparation Method of Ink

The ink can be prepared by dispersing or dissolving the water-dispersible coloring agent, the water-soluble organic solvent, the surfactant, the penetrating agent, and water, and optionally other substances in an aqueous medium, and optionally stirring and mixing the same. The stirring and mixing can be performed, for example, by a sand mill, a homogenizer, a ball mill, a paint shaker, a ultrasonic disperser, or the like, and it is also carried out by an agitator using an agitating blade, a magnetic stirrer, a high-speed disperser, or the like.

Recording Medium

A recording medium for use in the recording method of the present invention is preferably a plain paper without a coating layer. It is especially preferred that the recording medium is a plain paper having the sizing degree of 10 sec or longer, and the air permeance of 5 sec to 10 sec, which is generally used as a copying paper, and the like.

Recording Method

The recording method of the present invention contains a liquid composition deposition step, and an ink deposition step, where the liquid composition deposition step is applying the liquid composition of the present invention to a recording medium, and the ink deposition step is applying an ink to the recording medium to which the liquid composition has been applied. Each of these steps will be explained below.

Liquid Composition Deposition Step

The liquid composition deposition step is suitably selected without any restriction, provided that the step is performed in accordance with a method which can uniformly apply and deposit the liquid composition of the present invention on a surface of a recording medium. Examples of such method include blade coating, gravure coating, gravure off-set coating, bar coating, roller coating, knife coating, air knife coating, comma roller coating, U-comma roller coating, AKKU coating, smoothing coating, micro gravure coating, reverse roller coating, 4- or 5-roll coating, dip coating, curtain coating, slide coating, and die coating.

In the liquid composition deposition step, a deposition amount of the liquid composition onto the recording medium is 0.1 $g/m^2$ to 16.0 $g/m^2$, more preferably 0.2 $g/m^2$ to 10.0 $g/m^2$ on wet basis (i.e. the deposition amount of the liquid composition on the recording medium before being dried). When the deposition amount thereof is less than 0.1 $g/m^2$ on wet basis, qualities (e.g. density, saturation, resistance to color bleeding, and resistance to feathering) of an image of the recorded matter may remain the same to the level of the recorded matter obtained by the conventional methods. When the amount thereof is more than 16.0 $g/m^2$, the texture of the resulting recorded matter may be impaired, or curling of the recorded matter may be caused. Note that, if necessary, the recording medium to which the liquid composition has been applied is subjected to drying process. In this case, the recording medium can be dried by a roller heater, a drum heater, hot air, or the like.

Ink Deposition Step

The ink deposition step in the recording method of the present invention is applying an ink to the recording medium to which the liquid composition has been applied, so as to record an image on the recording medium. The method for applying the ink is preferably a method in which stimulus (energy) is applied to the ink by a certain device to thereby jet the ink from the device to deposit the ink on the recording medium. Specific examples thereof include various inkjet recording methods known in the art. Examples of such inkjet recording method include an inkjet recording method of head-scanning system, and an inkjet recording method in which an image is recorded on a certain sheet-shaped recording medium using aligned heads.

In the ink deposition step, the driving system of a recording head, which is a unit for jetting the ink, is not particularly restricted. Examples of the driving system include: a system using a piezoelectric element actuator using lead zirconate titanate (PZT, also referred to as "piezo"); a system for functioning thermal energy; a system for using an on-demand head utilizing actuator or the like using electrostatic force; and a system in which a charge-controlling continuous jetting head is used for recording. In the system for using the thermal energy, it is difficult to freely control jetting of droplets, and thus there are variations in the quality of an image to be recorded depending on a recording medium for use. However, the application of the liquid composition to the recording medium solves this problem, and a high quality recorded matter is stably provided regardless of a recording medium for use.

Recording Device

Figure 2:
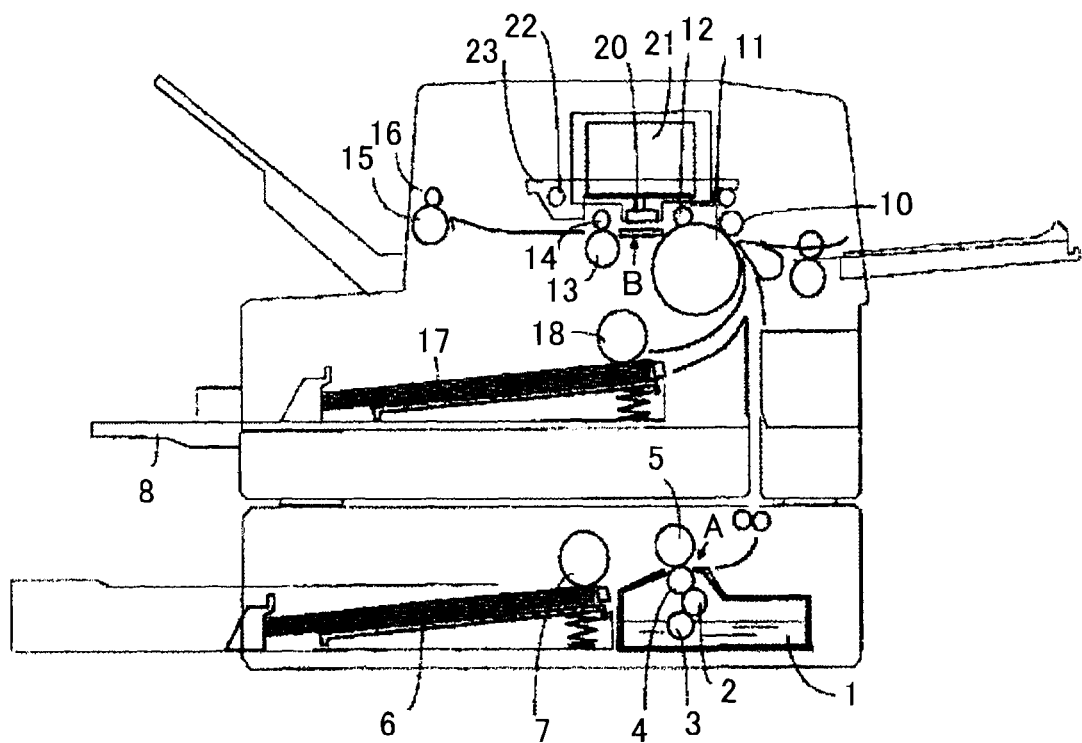
FIG. 2 is a cross-sectional side view showing an example of an apparatus used for the recording method of the present invention.

A specific example of the recording device for recording an image by applying the liquid composition of the present invention to a recording medium, and applying an ink to the recording medium to which the liquid composition has been applied will be explained with reference to FIG. 2. Use of this device allows to reduce (generally to 1 second or shorter) the time required for applying an ink to a recording medium from when a liquid composition is applied to the recording medium. In this case, even though an ink is applied to a recording medium before the liquid composition of the present invention is dried, image density of a resulting recorded matter improves. The recording device illustrated in FIG. 2 is a type of a recording device, which is configured to scan a surface of a recording medium with an inkjet recording head to record an image. In the recording device of FIG. 2, a recording medium 6 is fed by a feeding roller 7, and then to this recording medium 6 a liquid composition 1 is uniformly and thinly applied by means of an application roller 4 and a counter roller 5. The liquid composition 1 is scooped up by a scoop roller 3, and uniformly applied to the surface of the ink application roller 4 by means of a film thickness control roller 2. The recording medium 6 to which the liquid composition 1 has been applied is conveyed to a record scanning section where an inkjet recording head 20 is located. The length of a paper-conveying path from the end point for the operation of the application of the liquid composition (A section in FIG. 2) to the starting point of the record scanning section (B section in FIG. 2) is designed to be longer than the length of the recording medium 6 in the paper feeding direction, and thus by the time the recording medium 6 reaches the starting point of the record scanning section, application of the liquid composition 1 can be completely finished. In this case, since application of the liquid composition 1 can be implemented before the inkjet recording head 20 starts scanning for printing and the recording medium 6 is intermittently conveyed, the liquid composition 1 can be continuously applied with uniformity onto the recording medium 6 at a constant conveyance speed of the recording medium 6. Note that the exemplary apparatus illustrated in FIG. 2 is designed so that the recording medium 6 requiring treatment is supplied from the lower paper cassette and a recording medium 17 which is unnecessary to be treated or should not be treated is supplied from the upper paper cassette, it is convenient to provide a long paper-conveying path for conveying recording media.

In FIG. 2, "8" indicates a paper feeding tray, "10" indicates a document feeding roller, "11" to "16" each indicate a recording medium conveying roller, "18" indicates a feeding roller, "21" indicates an ink cartridge, "22" indicates a carriage shaft, and "23" indicates a carriage.

Figure 3:
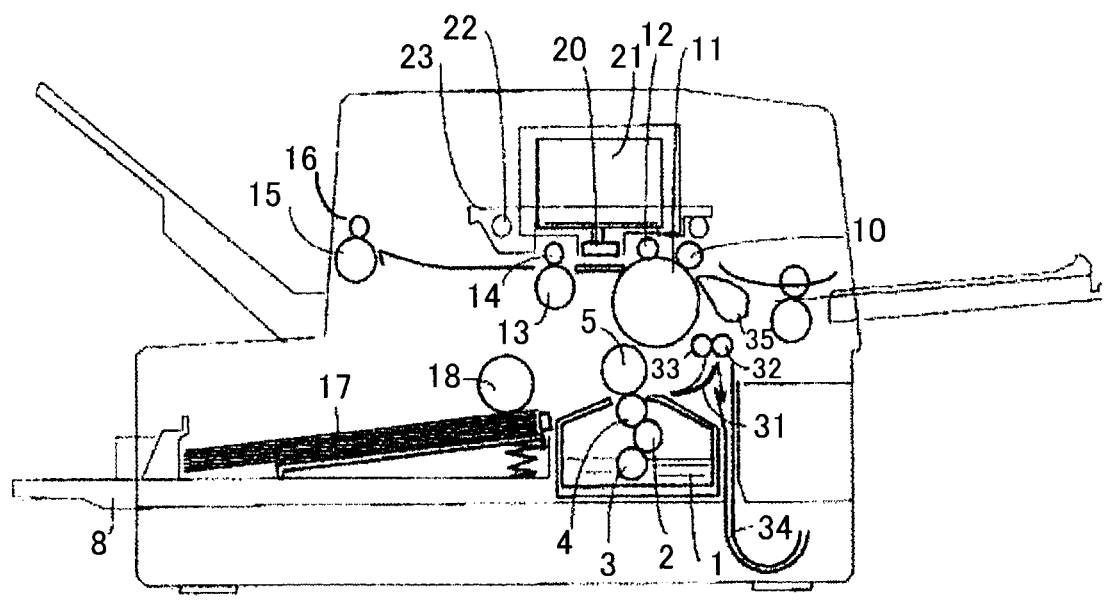
FIG. 3 is a cross-sectional side view showing another example of an apparatus used for the recording method of the present invention.

FIG. 3 illustrates another example of the recording device for use in the present invention. The device illustrated in FIG. 3 is also a type of a recording device, which is configured to scan a surface of a recording medium with an inkjet recording head to record an image, but is an example of the recording device having the structure more compact than that of the device of FIG. 2. A recording medium 17 is fed by a feeding roller 18, and to this recording medium a liquid composition 1 is uniformly and thinly applied by means of an application roller 4 and a counter roller 5. The liquid composition 1 is scooped up by a scoop roller 3, and uniformly applied to the surface of the ink application roller 4 by means of a film thickness control roller 2. With being applied with the liquid composition 1, the recording medium 17 passes a record scanning section where an inkjet recording head 20 is located, and is conveyed until application of the liquid composition 1 on the recoating medium 17 is completed. At the point where application of the liquid composition 1 to the recording medium 17 is completed, the recording medium 17 is again returned to the record scanning section until the front end of the recording medium 17 reaches the starting point of the record scanning section. Whether or not application of the inkjet treatment liquid is completed can be detected by providing a known recording-medium detection unit near the outlet of a liquid composition application unit of the recording device. This detection unit is not necessarily provided, and the apparatus may have a system configuration where information of the length of recording medium is previously input in a controller, and the feed per revolution of the outer periphery of a recording medium conveying roller corresponds to the length of the recording medium by controlling the number of revolutions of a motor.

In the case where recording is performed on both sides of the recording medium 17, the recording medium 17 to which the liquid composition 1 has been applied is conveyed again to the record scanning section before the liquid composition is dried and solidified. At this time, the recording medium 17 is intermittently conveyed again to the record scanning section so as to meet the timing with the scanning operation of the inkjet recording head 20. If a recording medium is returned to the same path through which it is first conveyed, the rear end of the recording medium is reversely entered into the liquid composition application unit, possibly causing defects such as nonuniform coating and jam of a recording medium. Therefore, when the recording medium is returned backward, the direction thereof is switched by a recording medium guide 31. That is, when the recording medium 17 is conveyed backward after being applied with the liquid composition 1, the recording medium guide 31 is moved by a known unit such as a solenoid and a motor to the position indicated with a dotted line in the figure. With this configuration, the recording medium 17 is conveyed to the position where a recording medium return guide 34, and thus it is possible to prevent smear of recording medium 17 and paper jam.

In FIG. 3, "8" indicates a paper feeding tray, "10" indicates a document feeding roller, "11" to "16" each indicate a recording medium conveying roller, "21" indicates an ink cartridge, "22" indicates a carriage shaft, "23" indicates a carriage, "32" and "33" each indicate a recording medium conveying roller and "35" indicates a document conveying roller.

The liquid composition deposition step is preferably continuously performed at a constant linear speed of 10 mm/s to 1,000 mm/s. In order to perform this step at such speed, in the aforementioned examples of the recording device, a recording medium in the form of a sheet is used, and an operation of applying an ink to a certain recording medium to form an image is started after an operation of applying the liquid composition to such recording medium is completed. In such recording device, the speed of applying the liquid composition and the speed of recording an image are not matched in most of cases, there is a difference in time from when the liquid composition is applied to when an image is recorded between the recording starting point of a certain sheet and the recording end point of the sheet. Even if this difference is significant, it is possible to substantially prevent evaporation of water from the liquid composition, as the liquid composition contains the water-soluble organic solvent, and having a water ratio close to an equilibrium water content in the air under an environment where a printer is used. Therefore, the difference in image quality caused between the recording start portion and the recording end portion of the sheet of the recording medium can be lowered to at least the level or lower where such a difference can be visually observed.

As is evident from the conveying process of a recording medium in this device, in most cases, a recording medium is necessary to be conveyed with members in contact with the recording medium coated with an inkjet treatment liquid, such as rollers, roller bearings, and guides, after application of the liquid composition onto the recording medium. In this case, if the liquid composition applied to a recording medium is transferred to conveying members of the recording medium, conveying functions may be damaged, and smear may accumulate thereon, causing degradation of image quality. The occurrence of such problem can be prevented by using members, for example, a guide of a wave-shaped plate, a spur-shaped roller bearing, and a roller whose surface is made of a water-repellent material.

In order to control the operation of the inkjet recording apparatuses as shown in FIGS. 2 and 3, when a print order is received by a host machine such as a personal computer, the image forming device starts to perform a head cleaning operation and a liquid composition application operation at the same time. After completion of these operations, the image recording device starts to perform an image recording operation. In this case, the image data transmitted per transmission may be the data corresponding to images for one scanning line, images for plural scanning lines, or images for one page. The head cleaning operation and ink-discharging check operation are not necessarily performed. In addition, it is not necessary to sequentially perform the head cleaning and ink-discharging check operations, and the image data processing and image data transmission operations. Namely, it is possible to start to perform in parallel the inkjet treatment liquid application, head cleaning, ink-discharging check, image data processing and image data transmission operations. By performing these operations in parallel, images can be recorded without substantially lowering throughput of the recording device even when the liquid composition application operation is performed.

Additional Embodiments

In the embodiments of the recording method described above, a certain ink is applied to a recording medium to which a certain liquid composition has been applied to record an image. Namely, the liquid composition is used as a pre-treatment liquid for recording, but use of the liquid composition is not limited to the pre-treatment liquid. The liquid composition may be used as a post-treatment liquid for recording by applying the liquid composition to a recording medium to which a certain ink has been applied to record an image, or used as a treatment liquid by simultaneously applying a certain ink and the liquid composition to a recording medium to record an image.

The ranges described above in the detailed description of the invention include all specific values and subranges therebetween.

EXAMPLES

Examples of the present invention will be explained hereinafter, but these examples shall not be construed as limiting to the scope of the present invention in any way.
Preparation of Ink Preparation Example 1

Preparation of Magenta Pigment-Containing Polymer Particle Dispersion Liquid

Preparation of Polymer Solution A
After replacing an inner atmosphere of a 1 L-flask equipped with a mechanical stirrer, a thermometer, a nitrogen inlet tube, a condensation tube and dropping funnel with nitrogen gas, 11.2 g of styrene, 2.8 g of acrylic acid, 12.0 g of lauryl methacrylate, 4.0 g of polyethylene glycol methacrylate, 4.0 g of styrene micromer, and 0.4 g of mercaptoethanol were added to and mixed in the flask, and the mixture was heated to 65° C. Next, a mixed solution of 100.8 g of styrene, 25.2 g of acryl acid, 108.0 g of lauryl methacrylate, 36.0 g of polyethylene glycol methacrylate, 60.0 g of hydroxyethyl methacrylate, 36.0 g of styrene macromer, 3.6 g of mercaptoethanol, 2.4 g of azobismethyl valeronitrile, and 18 g of methylethyl ketone was dropped in the flask over 2.5 hours. After the dropping was completed, a mixture solution of 0.8 g of azobismethyl valeronitrile and 18 g of methylethyl ketone was dropped into the flask over 0.5 hours. The resulting mixture in the flask was matured at 65° C. for 1 hour, and then 0.8 g of azobismethyl valeronitrile was added, followed by maturing for another 1 hour. After the completion of the reaction, 364 g of methylethyl ketone was added to the flask, to thereby obtain 800 g of Polymer Solution A having a concentration of 50% by mass.
Preparation of Pigment-Containing Polymer Particle Dispersion Liquid
After mixing and sufficiently stirring 28 g of Polymer Solution A, 42 g of C.I. Pigment RED 122, 13.6 g of 1 mol/L potassium hydroxide aqueous solution, 20 g of methylethyl ketone, and 13.6 g of ion-exchanged water, the mixture was kneaded by means of a roll-mill to thereby obtain a paste. The obtained paste was then added to 200 g of pure water, and the mixture was sufficiently stirred. Then, methylethyl ketone and water was removed from the mixture by means of an evaporator, and the resultant was subjected to pressure filtration using a polyvinylidene fluoride membrane filter having an average opening diameter of 5.0 μm to remove coarse particles, to thereby obtain a magenta pigment-containing polymer particle dispersion liquid containing 15% by mass of the pigment and having the solid content of 20% by mass. An average particle diameter ($D_{50}$) of the polymer particles contained in the obtained magenta pigment-containing polymer particle dispersion liquid was measured, and the average particle diameter ($D_{50}$) thereof was 82.7 nm. For the measurement of the average particle diameter ($D_{50}$), a particle size analyzer (NANOTRAC UPA-EX150, manufactured by NIKKISO CO., LTD.) was used.

Preparation Example 2

Preparation of Cyan Pigment-Containing Polymer Particles Dispersion Liquid

A cyan pigment-containing polymer particle dispersion liquid was prepared in the same manner as in Preparation Example 1, provided that C.I. Pigment Red 122 used in Preparation Example 1 as the pigment was replaced with a phthalocyanine pigment (C.I. Pigment Blue 15:3). An average particle diameter ($D_{50}$) of the polymer particles in the obtained cyan pigment-containing polymer particle dispersion liquid was measured by means of a particle size analyzer (NANOTRAC UPA-EX150, manufactured by NIKKISO CO., LTD.), and the average particle diameter ($D_{50}$) thereof was 110.6 nm.

Preparation Example 3

Preparation of Yellow Pigment-Containing Polymer Particles Dispersion Liquid

A cyan pigment-containing polymer particle dispersion liquid was prepared in the same manner as in Preparation Example 1, provided that C.I. Pigment Red 122 used in Preparation Example 1 as the pigment was replaced with a monoazo yellow pigment (C.I. Pigment Yellow 74). An average particle diameter ($D_{50}$) of the polymer particles in the obtained yellow pigment-containing polymer particle dispersion liquid was measured by means of a particle size analyzer (NANOTRAC UPA-EX150, manufactured by NIKKISO CO., LTD.), and the average particle diameter ($D_{50}$) thereof was 105.4 nm.

Preparation Example 4

Preparation of Black Pigment-Containing Polymer Particles Dispersion Liquid

A black pigment-containing polymer particle dispersion liquid was prepared in the same manner as in Preparation Example 1, provided that C.I. Pigment Red 122 used in Preparation Example 1 as the pigment was replaced with carbon black (FW100, manufactured by Evonik Degussa Japan Co., Ltd.). An average particle diameter ($D_{50}$) of the polymer particles in the obtained black pigment-containing polymer particle dispersion liquid was measured by means of a particle size analyzer (NANOTRAC UPA-EX150, manufactured by NIKKISO CO., LTD.), and the average particle diameter ($D_{50}$) thereof was 75.2 nm.

Preparation of Ink

Preparation of each ink was carried out in the following manner. At first, a water-soluble organic solvent, a penetrating agent, a surfactant, fungicide, and water presented in Tables 1 and 2 were uniformly mixed by stirring for 1 hour. Depending on the mixed solution, a water-dispersible resin was added, followed by stirring for 1 hour. Then, the pigment dispersion liquid, a defoaming agent, and a pH regulator were added, followed by stirring for 1 hour. The resulting dispersion liquid was subjected to pressure filtration using a polyvinylidene fluoride membrane filter having an average opening diameter of 5.0 µm to remove coarse particles, to thereby prepare each of Inks M1 to M4, C1 to C4, Y1 to Y4, B1 to B4.

TABLE 1

| | Substance (% by mass) | Ink M1 | C1 | Y1 | B1 | M2 | C2 | Y2 | B2 |
|---|---|---|---|---|---|---|---|---|---|
| Pigment dispersion liquid | Preparation Example 1 (magenta) | 53.3 | | | | | | | |
| | Preparation Example 2 (cyan) | | 33.3 | | | | | | |
| | Preparation Example 3 (yellow) | | | 33.3 | | | | | |
| | Preparation Example 4 (black) | | | | 53.3 | | | | |
| | Self-dispersible magenta pigment dispersion liquid (CAB-O-JET260) | | | | | 59.1 | | | |
| | Self-dispersible cyan pigment dispersion liquid (CAB-O-JET250) | | | | | | 45.5 | | |
| | Self-dispersible yellow pigment dispersion liquid (CAB-O-JET270) | | | | | | | 45.5 | |
| | Self-dispersible black pigment dispersion liquid (CAB-O-JET300) | | | | | | | | 53.3 |
| Water-dispersible resin | Fluororesin emulsion | | | | | 5.8 | 7.7 | 7.7 | 5.8 |
| | Acryl-silicone resin emulsion | | | | | | | | |
| Water-soluble organic solvent | 1,3-butanediol | 21.8 | 26.0 | 26.0 | | 30.0 | 17.0 | 27.0 | |
| | 3-methyl-1,3-butanediol | | | | 16.0 | | | | 16.0 |
| | 2-pyrrolidone | | | | | | | | 2.0 |
| | Glycerin | 14.5 | 13.0 | 13.0 | 16.0 | 10.0 | 17.0 | 9.0 | 16.0 |
| Penetrating agent | 2-ethyl-1,3-hexanediol | 1.0 | 1.0 | 1.0 | 1.0 | 2.0 | 2.0 | 2.0 | 2.0 |
| | 2,2,4-trimethyl-1,3-pentanediol | 1.0 | 1.0 | 1.0 | 1.0 | | | | |
| Surfactant | ZONYL FS-300 | 2.5 | 2.5 | 2.5 | 2.5 | | | | |
| | KF-643 | | | | | 1.0 | 1.0 | 1.0 | 1.0 |
| | SOFTANOL EP-7025 | | | | | | | | |
| Fungicide | Proxel GXL | 0.05 | 0.05 | 0.05 | 0.05 | 0.05 | 0.05 | 0.05 | 0.05 |
| Defoaming agent | Silicone defoaming agent KM-72F | 0.1 | 0.1 | 0.1 | 0.1 | 0.1 | 0.1 | 0.1 | 0.1 |
| pH regulator | 2-amino-2-ethyl-1,3-propanediol | 0.2 | 0.4 | 0.3 | 0.2 | 0.3 | 0.3 | 0.3 | 0.6 |
| | Pure water | balance | balance | balance | balance | balance | balance | balance | balance |
| | Total (% by mass) | 100 | 100 | 100 | 100 | 100 | 100 | 100 | 100 |

TABLE 2

| | Substance (% by mass) | Ink M3 | C3 | Y3 | B3 | M4 | C4 | Y4 | B4 |
|---|---|---|---|---|---|---|---|---|---|
| Pigment dispersion liquid | Preparation Example 1 (magenta) | 53.3 | | | | | | | |
| | Preparation Example 2 (cyan) | | 33.3 | | | | | | |
| | Preparation Example 3 (yellow) | | | 33.3 | | | | | |
| | Preparation Example 4 (black) | | | | 53.3 | | | | |
| | Self-dispersible magenta pigment dispersion liquid (CAB-O-JET260) | | | | | 63.6 | | | |
| | Self-dispersible (cyan pigment dispersion liquid (CAB-O-JET250) | | | | | | 45.5 | | |
| | Self-dispersible yellow pigment dispersion liquid (CAB-O-JET270) | | | | | | | 45.5 | |

TABLE 2-continued

| | Substance (% by mass) | M3 | C3 | Y3 | B3 | M4 | C4 | Y4 | B4 |
|---|---|---|---|---|---|---|---|---|---|
| Water-dispersible resin | Self-dispersible black pigment dispersion liquid (CAB-O-JET300) | | | | | | | | 53.3 |
| | Fluororesin emulsion | | | | | | | | |
| | Acryl-silicone resin emulsion | 8.0 | 10.0 | 10.0 | 12.5 | | | | |
| Water-soluble organic solvent | 1,3-butanediol | 23.0 | 24.0 | 24.0 | | 20.0 | 30.0 | 30.0 | |
| | 3-methyl-1,3-butanediol | | | | 17.0 | 2.0 | | | 21.0 |
| | 2-pyrrolidone | | | | 2.0 | | | | |
| | Glycerin | 7.5 | 8.0 | 8.0 | 8.5 | 10.0 | 10.0 | 10.0 | 10.5 |
| Penetrating agent | 2-ethyl-1.3-hexanediol | 2.0 | 2.0 | 2.0 | 2.0 | | | | |
| | 2,2,4-trimethyl-1,3-pentanediol | | | | | 1.0 | 1.0 | 1.0 | 1.0 |
| Surfactant | ZONYL FS-300 | 2.5 | 2.5 | 2.5 | 2.5 | | | | |
| | KF-643 | | | | | | | | |
| | SOFTANOL EP-7025 | | | | | 1.0 | 1.0 | 1.0 | 1.0 |
| Fungicide | Proxel GXL | 0.05 | 0.05 | 0.05 | 0.05 | 0.05 | 0.05 | 0.05 | 0.05 |
| Defoaming agent | Silicone defoaming agent KM-72F | 0.1 | 0.1 | 0.1 | 0.1 | | | | |
| pH regulator | 2 amino-2-ethyl-1,3-propanediol | 0.3 | 0.5 | 0.2 | 0.2 | 0.5 | 0.2 | 0.5 | 0.5 |
| | Pure water | balance | balance | balance | balance | balance | balance | balance | balance |
| | Total (% by mass) | 100 | 100 | 100 | 100 | 100 | 100 | 100 | 100 |

In Tables 1 and 2, Preparation Example 1 (magenta), Preparation Example 2 (cyan), Preparation Example 3 (yellow), and Preparation Example 4 (black) represent a magenta pigment-containing polymer particle dispersion liquid of Preparation Example 1, a cyan pigment-containing polymer particle dispersion liquid of Preparation Example 2, a yellow pigment-containing polymer particle dispersion liquid of Preparation Example 3, and a black pigment-containing polymer particle dispersion liquid of Preparation Example 4, respectively.

The abbreviations shown in Tables 1 and 2 are explained below.

CAB-O-JET 260: a self-dispersible magenta pigment, manufactured by CABOT CORPORATION, pigment solid content of 11%

CAB-O-JET 250: a self-dispersible cyan pigment, manufactured by CABOT CORPORATION, pigment solid content of 11%

CAB-O-JET 270: a self-dispersible yellow pigment, manufactured by CABOT CORPORATION, pigment solid content of 11%

CAB-O-JET 300: a self-dispersible yellow pigment, manufactured by CABOT CORPORATION, pigment solid content of 15%

Fluororesin emulsion: LUMIFLON FE4500, manufactured by ASAHI GLASS CO., LTD., solid content of 52% by mass, average particle diameter of 136 nm, and minimum film forming temperature (MFT) of 28° C.

Acryl-silicone resin emulsion: POLYSOL ROY6312, manufactured by SHOWA DENKO K.K., solid content of 40% by mass, average particle diameter of 171 nm, and minimum film forming temperature (MFT) of 20° C.

ZONYL FS-300: polyoxyethylene perfluoroalkyl ether, manufactured by Du Pont Kabushiki Kaisha, active principle content of 40% by mass KF-643: polyether-modofoed surfactant, manufactured by Shin-Etsu Chemical Co., Ltd., active principle content of 100% by mass SOFTANOL EP-7025: polyoxyalkylene alkyl ether, manufactured by Nippon Shokubai Co., Ltd., active principle content of 100% by mass Proxel GXL: fungicide containing 1,2-benzisothiazolin-3-one as a main component, manufactured by Arch Cemicals, Inc., active principle content of 20% by mass, containing dipropylene glycol KM-72F: self-emulsifiable silicone defoaming agent, manufactured by Shin-Etsu Chemical Co., Ltd., component content of 100% by mass Next, each of the prepared inks was evaluated in terms of their physical properties in accordance with the following evaluation methods. The results are shown in Table 3.

Average Particle Diameter ($D_{50}$)

The average particle diameter was measured at room temperature by means of a particle size analyzer (NANOTRAC UPA-EX150, manufactured by NIKKISO CO., LTD.).

Viscosity

The viscosity was measured at 25° C. by means of a viscometer (RE-550L, manufactured by TOKI SANGYO CO., LTD.).

Surface Tension

The surface tension was measured at 25° C. by means of an automatic surface tensiometer (CBVP-Z, Kyowa Interface Science Co., Ltd.).

TABLE 3

| | Physical properties | | |
|---|---|---|---|
| Ink | Average particle diameter $D_{50}$ (nm) | Viscosity (mPa·s) | Static surface tension (mN/m) |
| M1 | 86.6 | 7.93 | 24.5 |
| C1 | 125.2 | 8.15 | 24.6 |
| Y1 | 108.0 | 8.13 | 25.3 |
| B1 | 84.6 | 8.12 | 24.5 |
| M2 | 106.5 | 8.08 | 25.0 |
| C2 | 92.4 | 8.00 | 24.7 |
| Y2 | 137.5 | 8.09 | 24.6 |
| B2 | 132.0 | 8.14 | 24.6 |
| M3 | 90.7 | 8.01 | 24.9 |
| C3 | 126.1 | 8.18 | 25.1 |
| Y3 | 112.4 | 8.09 | 25.0 |
| B3 | 88.7 | 8.22 | 25.2 |
| M4 | 106.4 | 6.55 | 32.3 |
| C4 | 91.8 | 6.42 | 32.4 |
| Y4 | 139.2 | 6.71 | 32.5 |
| B4 | 133.1 | 6.46 | 31.9 |

Preparation of Liquid Composition

Each of liquid compositions was prepared in the manner described below.

At first, respective materials shown in Tables 4-1 to 4-3 were uniformly mixed by stirring for 1 hour. The resulting mixture of the materials of Liquid Composition 1 was then subjected to pressure filtration using a polyvinylidene fluoride membrane filter having an average opening diameter of 5.0 μm to remove coarse particles, to thereby prepare Liquid Composition 1. Liquid Compositions 2 to 21 were also prepared in the same manner.

TABLE 4-1

| Substance (% by mass) | | Liquid composition | | | | | | | | | |
|---|---|---|---|---|---|---|---|---|---|---|---|
| | | 1 | 2 | 3 | 4 | 5 | 6 | 7 | 8 | 9 | 10 |
| Organic acid | L-lactic acid | 11.76 | 11.76 | 11.76 | 11.76 | 11.76 | 11.76 | 11.76 | 11.76 | 11.76 | 11.76 |
| | L(+)-tartaric acid | | | | | | | | | | |
| | DL-malic acid | | | | | | | | | | |
| Amine | 2-amino-2-ethyl-1,3-propanediol | | 9.26 | 10.85 | 11.91 | 12.57 | 13.23 | 15.61 | 18.65 | 23.28 | 13.23 |
| | 2-amino-2-methyl-1,3-propanediol | | | | | | | | | | |
| Organic acid metal salt compound | Calcium lactate | | | | | | | | | | |
| Inorganic metal salt compound | Calcium nitrate | | | | | | | | | | |
| Water-soluble organic solvent | 1,3-butanediol | | | | | | | | | | |
| | 3-methyl-1,3-butanediol | 10.00 | 10.00 | 10.00 | 10.00 | 10.00 | 10.00 | 10.00 | 10.00 | 10.00 | |
| | Glycerin | 20.00 | 20.00 | 20.00 | 20.00 | 20.00 | 20.00 | 20.00 | 20.00 | 20.00 | 15.00 |
| Penetrating agent | 2-ethyl-1,3-hexanediol | 2.00 | 2.00 | 2.00 | 2.00 | 2.00 | 2.00 | 2.00 | 2.00 | 2.00 | 2.00 |
| Surfactant | ZONYL FS-300 | | | | | | | | | | |
| | FUTARGENT 251 | 0.50 | 0.50 | 0.50 | 0.50 | 0.50 | 0.50 | 0.50 | 0.50 | 0.50 | |
| | KF-643 | | | | | | | | | | |
| Fungicide | Proxel GXL | 0.05 | 0.05 | 0.05 | 0.05 | 0.05 | 0.05 | 0.05 | 0.05 | 0.05 | 0.05 |
| Anti-rust agent | 1,2,3-benzotriazol | 0.10 | 0.10 | 0.10 | 0.10 | 0.10 | 0.10 | 0.10 | 0.10 | 0.10 | 0.10 |
| | Pure water | Balance | Balance | Balance | Balance | Balance | Balance | Balance | Balance | Balance | Balance |
| | Total (% by mass) | 100.00 | 100.00 | 100.00 | 100.00 | 100.00 | 100.00 | 100.00 | 100.00 | 100.00 | 100.00 |

TABLE 4-2

| Substance (% by mass) | | Liquid composition | | | | | | | | |
|---|---|---|---|---|---|---|---|---|---|---|
| | | 11 | 12 | 13 | 14 | 15 | 16 | 17 | 18 | 19 |
| Organic acid | L-lactic acid | | | 11.76 | 11.76 | 5.88 | 5.88 | 11.76 | 11.76 | 11.76 |
| | L(+)-tartaric acid | 16.66 | | | | | | | | |
| | DL-malic acid | | 14.89 | | | | | | | |
| Amine | 2-amino-2-ethyl-1,3-propanediol | 26.46 | 26.46 | 11.91 | 12.57 | | 7.80 | 11.91 | | 11.91 |
| | 2-amino-2-methyl-1,3-propanediol | | | | | 5.84 | | | | |
| Organic acid metal salt compound | Calcium lactate | | | | 1.00 | 1.50 | | 1.00 | | |
| Inorganic metal salt compound | Calcium nitrate | | | | | 1.00 | 1.00 | | | |
| Water-soluble organic solvent | 1,3-butanediol | | | | | | 10.00 | | | |
| | 3-methyl-1,3-butanediol | 10.00 | 10.00 | 10.00 | 10.00 | 10.00 | | 20.00 | 10.00 | 10.00 |
| | Glycerin | 20.00 | 20.00 | 20.00 | 20.00 | 20.00 | 15.00 | 10.00 | 20.00 | 20.00 |

TABLE 4-2-continued

| | | Liquid composition | | | | | | | | |
|---|---|---|---|---|---|---|---|---|---|---|
| Substance (% by mass) | | 11 | 12 | 13 | 14 | 15 | 16 | 17 | 18 | 19 |
| Penetrating agent | 2-ethyl-1,3-hexanediol | 2.00 | 2.00 | 2.00 | 2.00 | 1.00 | 1.00 | 2.00 | 2.00 | 2.00 |
| Surfactant | ZONYL FS-300 | | | | | 1.00 | | | | |
| | FUTARGENT 251 | 0.50 | 0.50 | 0.50 | 0.50 | | | 1.00 | | |
| | KF-643 | | | | | | 1.00 | | | |
| | SOFTANOL EP-7025 | | | | | | | | | 0.50 |
| Fungicide | Proxel GXL | 0.05 | 0.05 | 0.05 | 0.05 | 0.05 | 0.05 | 0.05 | 0.05 | 0.05 |
| Anti-rust agent | 1,2,3-benzotriazol | 0.10 | 0.10 | 0.10 | 0.10 | 0.10 | 0.10 | 0.10 | 0.10 | 0.10 |
| | Pure water | Balance | Balance | Balance | Balance | Balance | Balance | Balance | Balance | Balance |
| Total (% by mass) | | 100.00 | 100.00 | 100.00 | 100.00 | 100.00 | 100.00 | 100.00 | 100.00 | 100.00 |

TABLE 4-3

| | | Liquid composition | |
|---|---|---|---|
| Substance (% by mass) | | 20 | 21 |
| Organic acid | L-lactic acid | 11.76 | 11.76 |
| | L(+)-tartaric acid | | |
| | DL-malic acid | | |
| Amine | 2-amino-2-ethyl-1,3-propanediol | 13.45 | |
| | 2-amino-2-methyl-1,3-propanediol | | 9.90 |
| Organic acid metal salt compound | Calcium lactate | | |
| Inorganic metal salt compound | Calcium nitrate | | |
| Water-soluble organic solvent | 1,3-butanediol | | |
| | 3-methyl-1,3-butanediol | 10.00 | 10.00 |
| | Glycerin | 20.00 | 20.00 |
| Penetrating agent | 2-ethyl-1,3-hexanediol | 2.00 | 2.00 |
| Surfactant | ZONYL FS-300 | | |
| | FUTARGENT 251 | 0.50 | 0.50 |
| | KF-643 | | |
| | SOFTANOL EP-7025 | | |
| Fungicide | Proxel GXL | 0.05 | 0.05 |
| Anti-rust agent | 1,2,3-benzotriazol | 0.10 | 0.10 |
| | Pure water | Balance | Balance |
| Total (% by mass) | | 100.00 | 100.00 |

The abbreviations in Tables 4-1 and 4-2 are as follows.

L-lactic acid: manufactured by TOKYO CHEMICAL INDUSTRY CO., LTD., purity of 85% or higher, having one carboxyl group L(+)-tartaric acid: manufactured by KANTO CHEMICAL CO., INC., purity of 99.5% or higher, having two carboxyl groups DL-malic acid: manufactured by KANTO CHEMICAL CO., INC., purity of 99% or higher, having two carboxyl groups ZONYL FS-300: polyoxyethylene perfluoroalkyl ether, manufactured by Du Pont Kabushiki Kaisha, active principle content of 40% by mass KF-643: polyether-modified silicone surfactant, manufactured by Shin-Etsu Chemical Co., Ltd., active principle content of 100% by mass FUTARGENT 251: branched perfluoroalkenyl group-containing fluorosurfactant, manufactured by NEOS COMPANY LIMITED, active principle content of 100% by mass Proxel GXL: fungicide containing 1,2-benzisothiazolin-3-one as a main component, manufactured by Arch Chemical, Inc., active principle content of 20% by mass, containing dipropylene glycol The physical properties of Liquid Composition 1 to 21 are shown in Table 5. Note that, the amine ratio to the organic acid was calculated using the following equation. Moreover, the metal corrosiveness was determined by immersing a piece of stainless steel (standard name: SUS303) in each of Liquid Composition 1 to 21, leaving there for 2 weeks under room temperature environment (evaluation environment: 23±1° C. in temperature, 50±10% RH in humidity), and visually evaluating the metal corrosiveness based on the following evaluation criteria.

Evaluation Criteria
A: Not corroded at all
B: Metallic luster slightly reduced
C: Slightly corroded
D: Corrosion was clearly observed $$\text{Amine ratio} = \frac{\text{Mol number}}{\text{Mol number of organic acid} + \text{The number of acid groups per molecule of organic acid}} \times 100$$

TABLE 5

| Liquid composition | Amine ratio to organic acid | pH | Surface tension (mN/m) | Metal corrosiveness |
|---|---|---|---|---|
| 1 | 0.00 | 1.71 | 22.5 | D |
| 2 | 0.70 | 4.55 | 22.0 | D |
| 3 | 0.82 | 4.93 | 22.1 | D |
| 4 | 0.90 | 6.91 | 22.6 | A |
| 5 | 0.95 | 7.28 | 22.5 | A |
| 6 | 1.00 | 7.98 | 22.1 | A |
| 7 | 1.18 | 8.47 | 22.1 | A |
| 8 | 1.41 | 8.81 | 22.3 | A |
| 9 | 1.76 | 9.10 | 22.3 | A |
| 10 | 1.00 | 8.18 | 46.3 | A |
| 11 | 1.00 | 5.51 | 22.8 | B |
| 12 | 1.00 | 6.11 | 22.4 | B |

TABLE 5-continued

| Liquid composition | Amine ratio to organic acid | pH | Surface tension (mN/m) | Metal corrosiveness |
|---|---|---|---|---|
| 13 | 0.90 | 6.71 | 22.4 | A |
| 14 | 0.95 | 6.94 | 22.3 | A |
| 15 | 1.00 | 7.61 | 27.3 | A |
| 16 | 1.18 | 8.12 | 20.9 | A |
| 17 | 0.90 | 6.69 | 22.3 | A |
| 18 | 0.00 | 1.67 | 52.2 | D |
| 19 | 0.90 | 7.05 | 30.8 | A |
| 20 | 1.00 | 7.87 | 22.4 | A |
| 21 | 1.00 | 7.84 | 22.2 | A |

Liquid Composition Deposition Step

In each Examples and Comparative Examples excluding Comparative Example 1, the liquid composition presented in Table 6 was applied to a recording medium (My Paper, high quality paper, manufactured by Ricoh Company Limited, basis weight of 69.6 g/m$^2$, sizing degree of 23.2 seconds, air permeance of 21 seconds) to deposit the liquid composition on the recording medium. The liquid composition of any of 1 to 21 was applied to the recording medium by roller coating by means of a roll coater to thereby deposit the liquid composition in an amount of 0.8 g/m$^2$ on wet basis, and then dried in the air.

Ink Deposition Step

In the ink deposition step, an ink was applied to the recording medium to which the liquid composition shown in Table 6 had been applied by using an inkjet recording device (IPSiO GX5000, manufactured by Ricoh Company Limited) mounted with an ink-set shown in Table 6 to thereby record an image in each of Examples and Comparative Examples. Note that, in Comparative Example 1, an ink was applied to a recording medium (My Paper) to which the liquid composition had not been applied to thereby record an image. Images to be recorded varied for each item of evaluations. Therefore, an image to be recorded will be explained in the section of the evaluation of the recorded matter. Note that, in the course of the application of the ink, driving voltage of a piezoelectric element was appropriately changed under the conditions adjusted to 23±0.5° C. in temperature, 50±5% RH in humidity to control an jetting amount of each ink constant. Moreover, a printing mode at the time of the application of the ink was set to "plain paper, high quality mode, color-matching off" by a driver attached to the inkjet recording device.

TABLE 6

| | Liquid composition | | |
|---|---|---|---|
| | No. | Wet deposition amount (g/m$^2$) | Ink-set |
| Ex. 1 | 4 | 0.8 | 1 |
| Ex. 2 | 5 | 0.8 | 1 |
| Ex. 3 | 6 | 0.8 | 1 |
| Ex. 4 | 7 | 0.8 | 1 |
| Ex. 5 | 8 | 0.8 | 1 |
| Ex. 6 | 9 | 0.8 | 1 |
| Ex. 7 | 10 | 0.8 | 1 |
| Ex. 8 | 13 | 0.8 | 1 |
| Ex. 9 | 14 | 0.8 | 2 |
| Ex. 10 | 15 | 0.8 | 3 |
| Ex. 11 | 16 | 0.8 | 1 |
| Ex. 12 | 17 | 0.8 | 1 |
| Ex. 13 | 19 | 0.8 | 1 |
| Ex. 14 | 20 | 0.8 | 1 |
| Ex. 15 | 21 | 0.8 | 1 |
| Ex. 16 | 6 | 0.32 | 1 |
| Ex. 17 | 6 | 1.6 | 1 |
| Ex. 18 | 6 | 3.2 | 1 |
| Ex. 19 | 6 | 8.0 | 1 |
| Ex. 20 | 6 | 16 | 1 |
| Comp. Ex. 1 | — | — | 4 |
| Comp. Ex. 2 | 1 | 0.8 | 1 |
| Comp. Ex. 3 | 2 | 0.8 | 1 |
| Comp. Ex. 4 | 3 | 0.8 | 1 |
| Comp. Ex. 5 | 1 | 0.8 | 4 |
| Comp. Ex. 6 | 18 | 0.8 | 1 |
| Comp. Ex. 7 | 11 | 0.8 | 1 |
| Comp. Ex. 8 | 12 | 0.8 | 1 |

In Table 6, each ink set consists of the following inks.
Ink-Set 1: Ink M1, Ink C1, Ink Y1, Ink B1
Ink-Set 2: Ink M2, Ink C2, ink Y2, Ink B2
Ink-Set 3: Ink M3, Ink C3, Ink Y3, Ink B3
Ink-Set 4: Ink M4, Ink C4, Ink Y4, Ink B4

Evaluation of Recorded Matter

The recorded matters of Examples and Comparative Examples above were evaluated in the following manner.

Density

A recorded matter on which a symbol "■" of 64 point was recorded by using Microsoft® Word2000, and the density of the image "■" on the recorded surface was measured by X-Rite 939. The results were evaluated based on the following evaluation criteria.

Evaluation Criteria
A: 1.45 or more in Black,
   0.90 or more in Yellow,
   1.10 or more in Magenta
   1.25 or more in Cyan
B: 1.4 or more but less than 1.45 in Black,
   0.85 or more but less than 0.90 in Yellow,
   1.05 or more but less than 1.10 in Magenta
   1.20 or more but less than 1.25 in Cyan
C: 1.35 or more but less than 1.4 in Black
   0.80 or more but less than 0.85 in Yellow
   1.0 or more but less than 1.05 in Magenta
   1.15 or more but less than 1.20 in Cyan
D: Less than 1.35 in Black
   Less than 0.80 in Yellow
   Less than 1.0 in Magenta
   Less than 1.15 in Cyan Saturation Using the recorded matter formed in the same manner as the sample for the aforementioned test for density, saturation of the "■" part of the image on the recorded surface was measured by means of X-Rite 939. Then, the obtained values for the saturation was calculated to obtain a ratio to the saturation values (Yellow: 91.34, Magenta: 74.55, Cyan: 62.82) of the standard color (Japan color ver. 2), and the results were evaluated based on the following evaluation criteria.

Evaluation Criteria
A: 0.85 or more
B: 0.8 or more, but less than 0.85
C: 0.75 or more, but less than 0.8
D: Less than 0.75

Color Bleeding

A recorded matter to which a yellow solid image, and magenta, cyan, and black line images each having the width of 0.5 mm on the yellow solid image were recorded was prepared, and color bleeding at the border between inks of different colors was visually observed. In the same manner as above, a recording matter to which a cyan solid image, and magenta, yellow, and black line images each having the width of 0.5 mm on the cyan solid image were recorded, and a recorded matter to which a magenta solid image, and cyan, yellow, and black line images each having the width of 0.5 mm on the magenta solid image were recorded were subjected to the observation whether or not bleeding occurred at the border between the different colors.

Evaluation Criteria
A: No problem
B: Bleeding was slightly caused, but it is not a problem.
C: Bleeding was caused, and it is problematic.

Feathering
A recorded matter on which the Chinese character " 隷 " of 6 point was recorded in black by using Microsoft® Word 2000, and occurrence of feathering at the portion of the black character " 隷 " on the recorded surface was visually observed. The results were evaluated based on the following evaluation criteria.

Evaluation Criteria
A: No problem
B: Very slightly occurred, but no problem
C: Slightly occurred and it is problematic
D: Occurred and it is problematic White Spot
A recorded matter on which a symbol "■" of 64 point was recorded in each color of yellow, magenta, cyan, and black by using Microsoft® Word 2000, and the image part of the symbol "■" was visually observed and evaluated whether or not there were white missing spots formed in the symbol "■".

Evaluation Criteria
A: No problem
B: There are only a few white spots, but no problem
C: There are white spots, but level of which is under the tolerance and therefore no problem
D: Problematic Abrasion Resistance
A recorded matter to which a monochrome solid image in the size of 3 cm×3 cm was recorded by using Microsoft® Word 2000 was dried for 24 hours under the conditions of 23±1° C. in temperature, 50±10% RH in humidity. Next, JIS L 0803 cotton cloth No. 3 attached to a clock meter CM-1 Crock Meter with a double-sided tape was moved back and forth five times to be in contact with the monochrome solid image of the recorded matter, and the density of the ink attached to the cotton cloth was measured by X-Rite 939, from which the density of the original color of the cotton cloth was taken away to thereby determine the density of the smeared part. The density of the smeared part was evaluated based on the following criteria.

Evaluation Criteria
A: Less than 0.03
B: 0.03 or more but less than 0.07
C: 0.07 or more but less than 0.1
D: 0.1 or more Drying Properties
A recorded matter to which a monochrome solid image in the size of 3 cm×3 cm was recorded by using Microsoft® Word 2000 was prepared. Just after the recording (i.e. 10 seconds after the recording), JIS L 0803 cotton cloth No. 3 attached to a clock meter CM-1 Crock Meter with a double-sided tape was moved back and forth five times to be in contact with the monochrome solid image of the recorded matter, and then the density of the ink attached to the cotton cloth was measured by X-Rite 939, from which the density of the original color of the cotton cloth was taken away to thereby determine the density of the smeared part. The density of the smeared part was evaluated based on the following criteria. Note that this test for the evaluation was performed under the conditions of 23±1° C. in temperature, and 50±10% RH in humidity.

Evaluation Criteria
A: Less than 0.15
B: 0.15 or more but less than 0.20
C: 0.20 or more but less than 0.25
D: 0.25 or more The results are shown in Table 7. Note that, the results were evaluated on each color of the sample based on the evaluation criteria, but only the most frequent evaluation result among the evaluation results of all the colors was presented below as the evaluation result for each item. Moreover, when there were two frequent results of the equal numbers, the better result was shown below.

TABLE 7

| | Density | Saturation | Feathering | Color bleeding | White-out | Abrasion resistance | Drying properties |
|---|---|---|---|---|---|---|---|
| Ex. 1 | A | A | A | A | A | A | A |
| Ex. 2 | A | A | A | A | A | A | A |
| Ex. 3 | A | A | A | A | A | A | A |
| Ex. 4 | B | A | B | A | A | A | A |
| Ex. 5 | B | B | B | B | A | A | A |
| Ex. 6 | C | B | B | B | B | A | A |
| Ex. 7 | A | A | A | A | A | C | B |
| Ex. 8 | A | A | A | A | A | B | A |
| Ex. 9 | A | A | A | A | A | B | B |
| Ex. 10 | A | A | A | A | B | B | B |
| Ex. 11 | A | A | B | A | A | B | A |
| Ex. 12 | A | A | A | A | A | B | A |
| Ex. 13 | A | A | A | A | A | B | C |
| Ex. 14 | A | A | A | A | A | A | A |
| Ex. 15 | A | A | A | A | A | A | A |
| Ex. 16 | B | A | B | B | A | A | A |
| Ex. 17 | A | A | A | A | A | A | A |
| Ex. 18 | A | A | A | A | A | A | B |
| Ex. 19 | A | A | A | A | A | B | B |
| Ex. 20 | A | A | A | A | A | B | C |
| Comp. Ex. 1 | D | C | C | C | D | B | B |
| Comp. Ex. 2 | A | A | A | A | A | C | C |
| Comp. Ex. 3 | A | A | A | A | A | C | C |
| Comp. Ex. 4 | A | A | A | A | A | C | C |
| Comp. Ex. 5 | B | B | B | B | C | C | D |
| Comp. Ex. 6 | A | A | A | B | A | D | D |
| Comp. Ex. 7 | C | C | B | A | A | A | B |
| Comp. Ex. 8 | C | C | B | A | A | A | B |

This application claims priority to Japanese application No. 2010-147607, filed on Jun. 29, 2011, and incorporated herein by reference.

What is claimed is:
1. A recording method, comprising:
applying a liquid composition to a recording medium; and
applying an ink to the recording medium to which the liquid composition has been applied, so as to record an image, where the ink contains a water-dispersible coloring agent, a water-soluble organic solvent, a surfactant, a penetrating agent, and water, wherein the liquid composition comprises:
(a) a salt of
(i) lactic acid; and
(ii) a water-soluble amine selected from the group consisting of 2-amino-2-methyl-1,3-propanediol or 2-amino-2-ethyl-1,3-propanediol;
(b) a water-soluble organic solvent; and
(c) water,
wherein an amount of the water-soluble amine contained in the liquid composition is at least 0.9 mol relative to 1 mol of the lactic acid.

2. The recording method according to claim 1, wherein the liquid composition is applied to the recording medium in an amount of 0.1 g/m² to 16.0 g/m² on wet basis.

3. The recording method according to claim 1, wherein the water-dispersible coloring agent is a pigment which is at least one selected from the group consisting of a self-dispersible pigment, and a resin-coated pigment.

4. A recorded matter, comprising:
a recording medium; and
an image recorded on the recording medium,
wherein the image is recorded on the recording medium by a recording method, which contains:
applying a liquid composition to the recording medium; and
applying an ink to the recording medium to which the liquid composition has been applied, so as to record the image, where the ink contains a water-dispersible coloring agent, a water-soluble organic solvent, a surfactant, a penetrating agent, and water,
wherein the liquid composition comprises:
(a) a salt of
(i) lactic acid; and
(ii) a water-soluble amine selected from the group consisting of 2-amino-2-methyl-1,3-propanediol or 2-amino-2-ethyl-1,3-propanediol;
(b) a water-soluble organic solvent; and
(c) water,
wherein an amount of the water-soluble amine contained in the liquid composition is at least 0.9 mol relative to 1 mol of the lactic acid.

5. The recording method of claim 1, wherein the water-soluble amine is 2-amino-2-methyl-1,3-propanediol.

6. The recording method of claim 1, wherein the water-soluble amine is 2-amino-2-ethyl-1,3-propanediol.

7. The recorded matter of claim 4, wherein the water-soluble amine is 2-amino-2-methyl-1,3-propanediol.

8. The recorded matter of claim 4, wherein the water-soluble amine is 2-amino-2-ethyl-1,3-propanediol.

* * * * *